US011062579B2

(12) United States Patent
Eswara et al.

(10) Patent No.: US 11,062,579 B2
(45) Date of Patent: Jul. 13, 2021

(54) VIDEO MONITORING SYSTEM WITH PRIVACY FEATURES

(71) Applicant: Honeywell International Inc., Morris Plains, NJ (US)

(72) Inventors: Lalitha M. Eswara, Bangalore (IN); Harika Sarvani Kattamuru, Bangalore (IN); Anagha Moosad, Bangalore (IN); Bhavya Hanumegowda, Morris Plains, NJ (US); Balamurugan Ganesan, Bengaluru (IN); Jeremy Kimber, Morris Plains, NJ (US); Vijay Dhamija, Cummings, GA (US); Ismaiel Shaik, Bangalore (IN); Abhisekh Jain, Madurai (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 16/565,323

(22) Filed: Sep. 9, 2019

(65) Prior Publication Data
US 2021/0074135 A1  Mar. 11, 2021

(51) Int. Cl.
*G08B 13/196* (2006.01)
*G06K 9/00* (2006.01)
(Continued)

(52) U.S. Cl.
CPC ....... *G08B 13/19686* (2013.01); *G06F 21/32* (2013.01); *G06K 9/00228* (2013.01);
(Continued)

(58) Field of Classification Search
CPC .... G08B 13/19686; G08B 7/06; H04N 7/183; G06K 9/00295; G06K 9/00228; G06K 9/00771; G06F 21/32
See application file for complete search history.

(56) References Cited

U.S. PATENT DOCUMENTS 6,317,795 B1   11/2001   Malkin et al.
9,020,261 B2    4/2015   Lipton et al.
(Continued)

FOREIGN PATENT DOCUMENTS

DE   10158990 C1   4/2003
EP    3137967 A1   3/2017
(Continued)

OTHER PUBLICATIONS

"MAXPRO VMS, Video Management System," Honeywell, 4 pages, 2018.
(Continued)

*Primary Examiner* — Nam D Pham
(74) *Attorney, Agent, or Firm* — Seager, Tufte & Wickhem, LLP

(57) ABSTRACT

A surveillance monitoring system may use a camera to detect any viewing faces visible within viewing sight of a monitor and determine whether the detected viewing faces belong to authorized individuals who are authorized to view video surveillance footage on the monitor or if any of the detected viewing faces belong to individuals who are not authorized to view video surveillance footage on the monitor. When the detected viewing faces belong only to authorized individuals, the surveillance monitoring system continues to display the video surveillance footage that includes identifiable faces without anonymizing the identifiable faces. When the detected viewing faces also include unauthorized individuals, the surveillance monitoring system may continue to display the video surveillance footage, but the surveillance monitoring system may automatically anonymize one or more of the identifiable faces seen in the video surveillance footage.

15 Claims, 18 Drawing Sheets

(51) Int. Cl.
*G06F 21/32* (2013.01)
*G08B 7/06* (2006.01)
*H04N 7/18* (2006.01)

(52) U.S. Cl.
CPC ..... *G06K 9/00295* (2013.01); *G06K 9/00771* (2013.01); *G08B 7/06* (2013.01); *H04N 7/183* (2013.01)

(56) References Cited

U.S. PATENT DOCUMENTS

| | | |
|---|---|---|
| 9,398,280 B2 | 7/2016 | Nikkanen et al. |
| 9,530,045 B2 | 12/2016 | Wang et al. |
| 9,648,285 B2 | 5/2017 | Traff et al. |
| 2009/0041297 A1 | 2/2009 | Zhang et al. |
| 2010/0205667 A1* | 8/2010 | Anderson ............... G06F 3/017 726/19 |
| 2013/0205410 A1 | 8/2013 | Sambamurthy et al. |
| 2019/0147175 A1 | 5/2019 | Varerkar et al. |

FOREIGN PATENT DOCUMENTS

| | | |
|---|---|---|
| EP | 3039864 B1 | 9/2018 |
| WO | 2017129804 A1 | 3/2017 |

OTHER PUBLICATIONS

Ang et al., "Detect and Locate Stranger Intrusion," AWS DeepLens, 6 pages, 2020.
EP Rule 64 Communication, Partial European Search Report, Application No. 20195381.7, dated Jan. 26, 2021, 15 pgs.

* cited by examiner

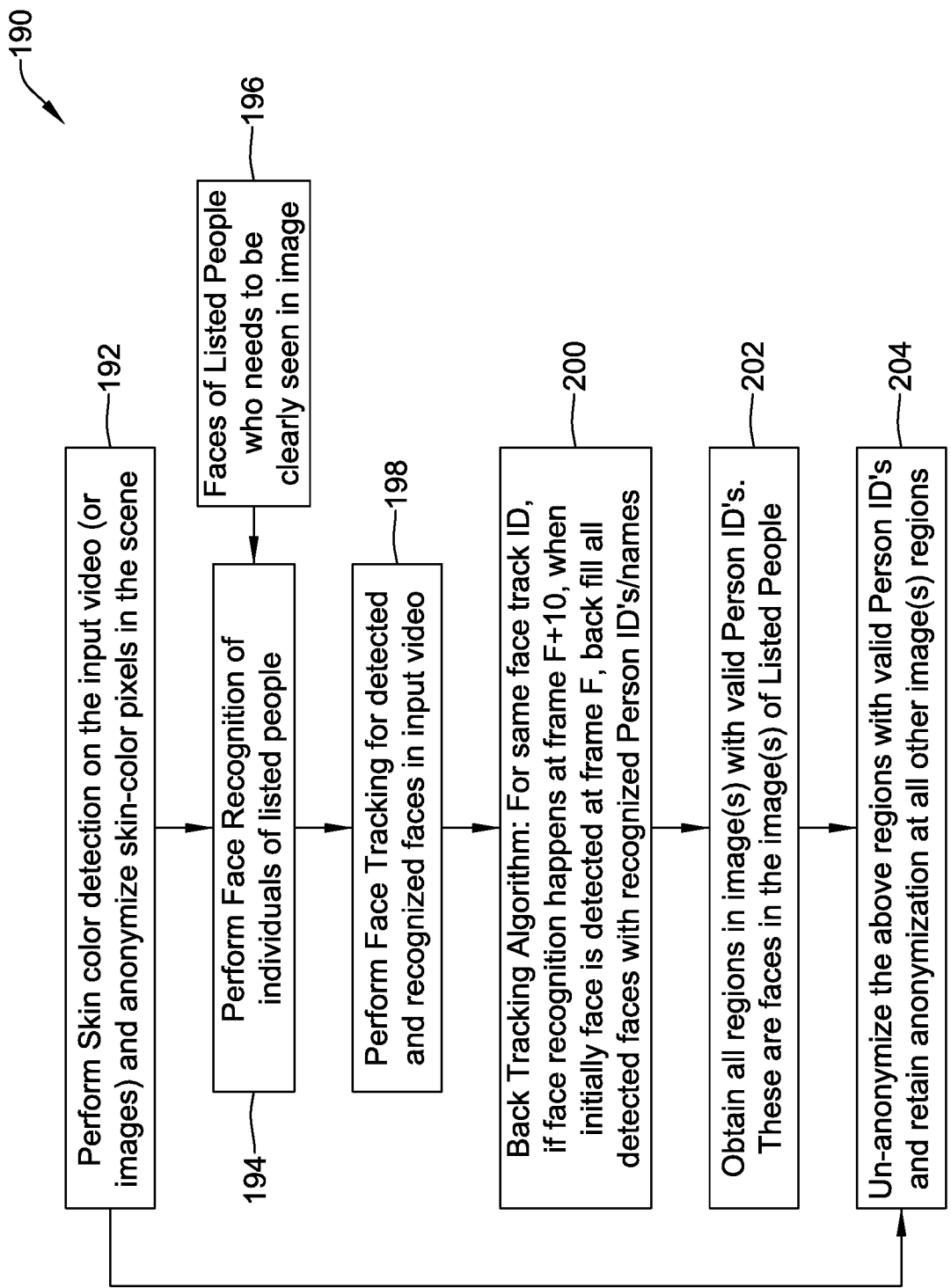

VIDEO MONITORING SYSTEM WITH PRIVACY FEATURES

TECHNICAL FIELD

The present disclosure relates generally to a video monitoring system. More particularly, the present disclosure relates to methods and systems for monitoring video surveillance footage while satisfying privacy requirements.

BACKGROUND

Known video surveillance systems often include a large number of video cameras that are used to provide video surveillance. The video surveillance may be monitored live by one or more security operators that watch video on one or more monitors for signs of suspicious behavior and other potential issues. In some cases, prior captured video may be pulled up from memory or other storage and viewed in response to a particular incident, for example. Due to privacy concerns, there may be situations in which the identity of least some individuals shown in the video surveillance needs to be anonymized. There may be privacy concerns raised as well by who is reviewing the video surveillance. While video monitoring systems are known, there is a need for improved video monitoring systems generally and video monitoring systems that meet certain privacy requirements specifically.

SUMMARY

The present disclosure relates generally to a video monitoring system that permit access to video surveillance while satisfying certain privacy requirements. In some instances, a video monitoring system may itself include a camera that is trained on those watching the video surveillance footage on an operator's monitor. When only authorized individuals are seen to be watching, the video that is displayed may not be altered to anonymize some or all of the individuals shown in the video. If any unauthorized individuals are found to be watching, the displayed video may be altered to anonymize one or more of the individuals shown in the video in order to protect their privacy. The present disclosure also pertains to methods of selectively anonymizing persons in a video. For example, certain classifications of individuals may be anonymized while other classifications of individuals may not be anonymized.

The preceding summary is provided to facilitate an understanding of some of the innovative features unique to the present disclosure and is not intended to be a full description. A full appreciation of the disclosure can be gained by taking the entire specification, claims, figures, and abstract as a whole.

BRIEF DESCRIPTION OF THE FIGURES

The disclosure may be more completely understood in consideration of the following description of various examples in connection with the accompanying drawings, in which:

FIG. 18 is a flow diagram showing an illustrative method that may be carried out via the illustrative video monitoring systems of FIGS. 3 and 4.

Figure 1:
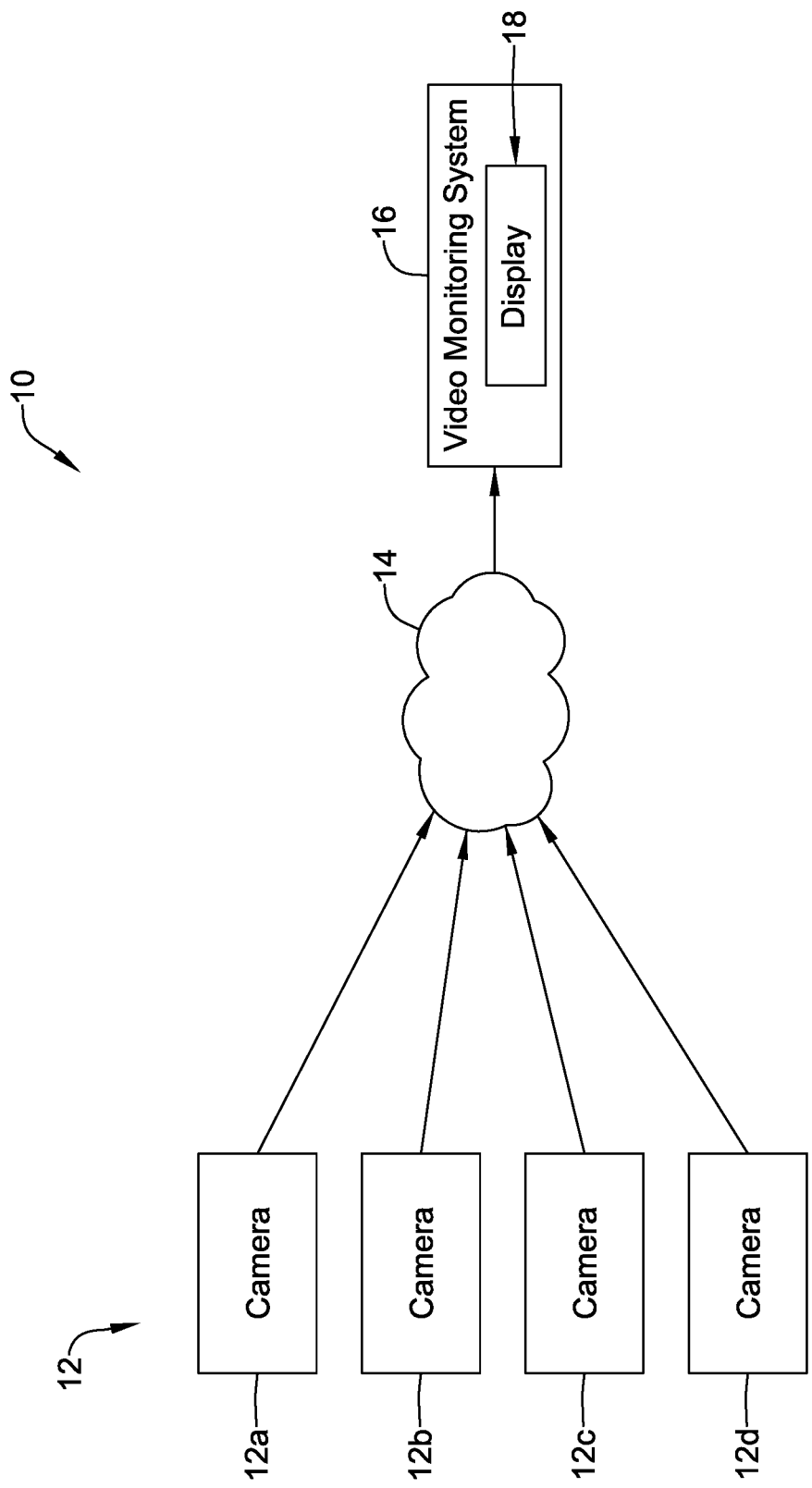
FIG. 1 is a schematic block diagram of an illustrative video surveillance system that includes a video monitoring system.

While the disclosure is amenable to various modifications and alternative forms, specifics thereof have been shown by way of example in the drawings and will be described in detail. It should be understood, however, that the intention is not to limit the disclosure to the particular examples described. On the contrary, the intention is to cover all modifications, equivalents, and alternatives falling within the spirit and scope of the disclosure.

DESCRIPTION

The following description should be read with reference to the drawings, in which like elements in different drawings are numbered in like fashion. The drawings, which are not necessarily to scale, depict examples that are not intended to limit the scope of the disclosure. Although examples are illustrated for the various elements, those skilled in the art will recognize that many of the examples provided have suitable alternatives that may be utilized.

All numbers are herein assumed to be modified by the term "about", unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic is described in connection with an embodiment, it is contemplated that the feature, structure, or characteristic may be applied to other embodiments whether or not explicitly described unless clearly stated to the contrary.

The present disclosure relates generally to video surveillance systems that include a plurality of video cameras and a video monitoring system. FIG. 1 is a schematic block diagram of an illustrative video surveillance system 10 that includes a plurality of cameras 12. While a total of four cameras 12a, 12b, 12c, 12d are shown, it will be appreciated that this is merely illustrative, as the video surveillance system 10 may include any number of cameras 12. For example, the video surveillance system 10 may include tens, hundreds or even thousands of cameras 12. While the cameras 12 are described as video cameras that each provide a video stream, in some cases at least some of the cameras 12 may be still cameras that capture still images, perhaps on a particular schedule or in response to detected motion.

In some instances, the images or video streams captured by each of the cameras 12 may be transmitted to a server 14. In some cases, the server 14 may provide live video streams to a video monitoring system 16, and may store or archive some or all of the video streams for later review using the video monitoring system 16. While the server 14 is illustrated as being a cloud server, this is not necessary in all cases. The server 14 may represent a single computer, or the server 14 may represent a large number of computers that are networked together. In some cases, the server 14 may simply be a video recorder/video router. Some of the cameras 12 may be hard wired to a device such as a computer, a router or a modem, that itself communicates with the server 14. Some of the cameras 12 may communicate wirelessly with the server 14, using any desired wireless communication protocol such as but not limited to cellular communication, ZigBee, REDLINK™, Bluetooth, WiFi, IrDA, dedicated short range communication (DSRC), EnOcean, and/or any other suitable common or proprietary wireless protocol, as desired.

The video monitoring system 16 may be in communication with the server 14 such that the images or video streams captured by each of the cameras 12 may be accessed by the video monitoring system 16 and viewed on a display 18 of the video monitoring system 16. In some instances, the video monitoring system 16 may be used to control one or more of the cameras 12, or to adjust one or more of the cameras 12. The video monitoring system 16 may be disposed near where at least some of the cameras 12 are located, or may be remote from the cameras 12. In some instances, the video monitoring system 16 may be configured to display videos received from cameras 12 that are located in a number of different locations. It will be appreciated that a security officer, for example, may use the video monitoring system 16 to live-stream one or more video streams from one or more of the cameras 12. A security officer may also use the video monitoring system 16 to review archived video, particularly if there was an incident of some sort and the security officer wants or needs to take a closer look.

Figure 2:
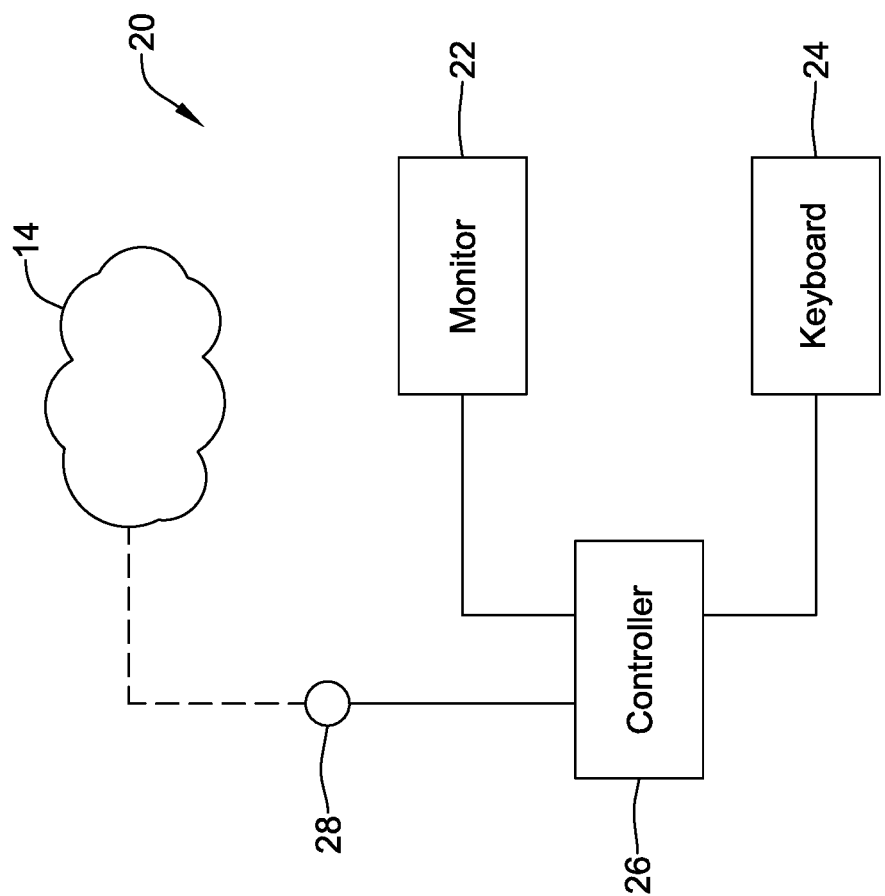
FIG. 2 is a schematic block diagram of an illustrative video monitoring station usable by a security operator for monitoring video of a video surveillance system.

FIG. 2 is a schematic block diagram of an illustrative video monitoring station 20 usable by a security operator for monitoring video of a video surveillance system, such as video surveillance system 10 shown in FIG. 1. While a single monitor 22 is shown, this is merely illustrative. In some cases, the video monitoring station 20 may include two, three, four or more monitors 22. In some instances, the monitor 22 may represent a wall of monitors, or a large display unit that is configured to display a plurality of different video streams simultaneously in a grid fashion. The monitor 22 may be mounted on a wall. In some cases, the monitor 22 may sit on a desk (not illustrated). The illustrative video monitoring station 20 include a keyboard 24 and a controller 26. The controller 26 may, for example, be a desktop computer or a laptop computer. The controller 26 may be manifested in the cloud, and the video monitoring station 20 may thus represent a dumb terminal that connects to a cloud-based terminal server. The keyboard 24 may be used to solicit information from the controller 26, or to provide information to the controller 26. While a keyboard 24 is generically represented, it will be appreciated that other input devices may additionally or alternatively be used, including a mouse, a track ball, a touch screen surface and the like. These are just examples.

As illustrated, the illustrative video monitoring station 20 also includes a video camera 28 that is operably coupled to the controller 26. In some cases, the video camera 28 may be considered as being aimed at, or having a field of view, that corresponds to where the security operator would sit or stand while operating the keyboard 24 and viewing the monitor 22. In some cases, particularly if the video monitoring station 20 is manifested as laptop computer, the video camera 28 may be a web-cam that is built into the laptop. The video camera 28 may be operably coupled to the controller 26 such that the controller 26 receives a video stream from the video camera 28. Additionally or alternatively, the video camera 28 may be in communication with the cloud 14. In either case, the controller 26 and/or the cloud 14 may be configured to analyze the video stream provided by the video camera 28 to ensure that the individual operating the video monitoring station 20 is authorized to do so. The video stream from the video camera 28 may also be analyzed to ensure that nobody else is standing behind the security officer in a position to possibly sneak a peak at the video displayed on the monitor 22. As will be discussed with respect to subsequent Figures, the video stream from the video camera 28 may be analyzed to identify authorized individuals who are authorized to view the video displayed on the monitor 22, and possibly identify unauthorized individuals who are not authorized to view the video displayed on the monitor 22. If unauthorized individuals are detected, the controller 26 and/or the cloud 14 may take actions to ensure that individual privacy is maintained, sometimes by anonymizing certain individuals in the video in real-time.

Figure 3:
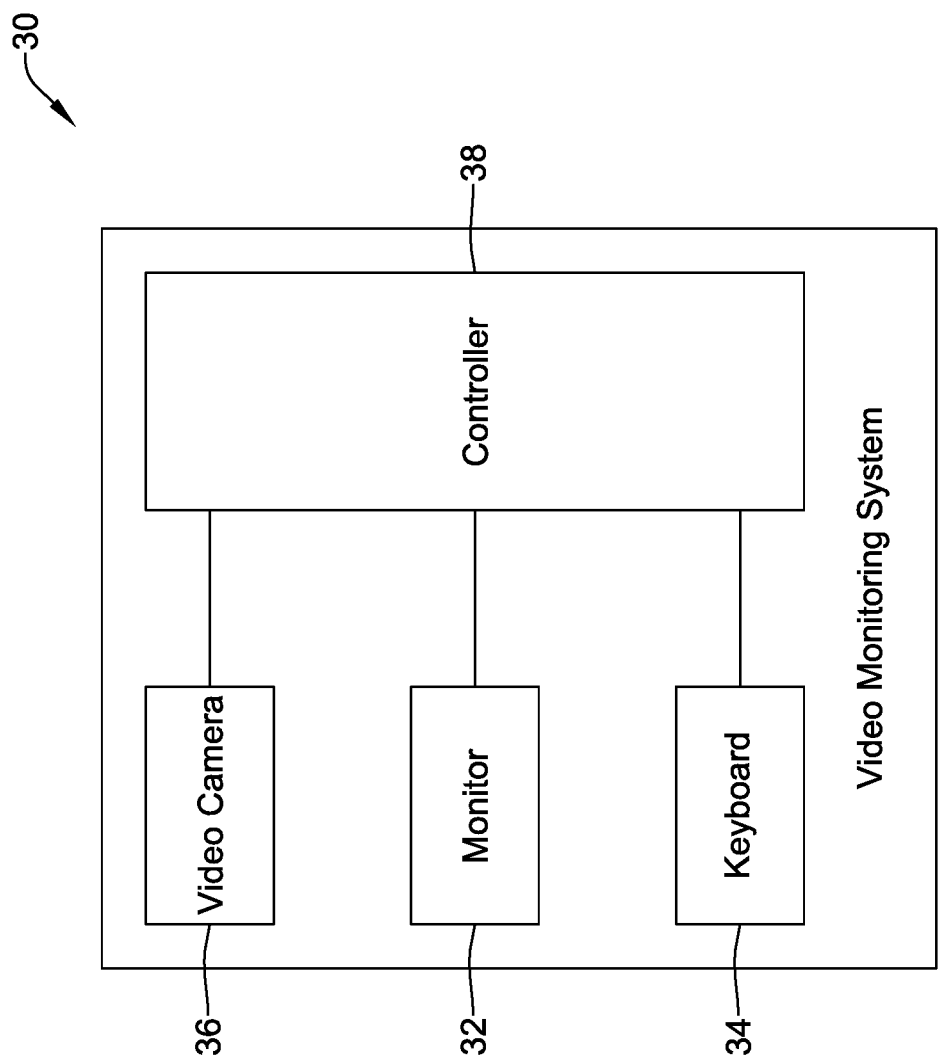
FIG. 3 is a schematic block diagram of an illustrative video monitoring system usable in the illustrative video surveillance system of FIG. 1.

FIG. 3 is a schematic block diagram of a video monitoring system 30 that is configured to provide privacy for individuals shown in video surveillance footage while displaying the video surveillance footage on the video monitoring system 30. The video monitoring system 30 may be considered as being an example of the video monitoring system 16 shown in FIG. 1, and may in some instances include elements and/or features of the video monitoring station 20 shown in FIG. 2. The video monitoring system 30 includes a monitor 32 that is configured to display video surveillance footage as well as a keyboard 34. A video camera 36 may be aimed at a space in front of the monitor 32 and the keyboard 34 and thus may be positioned to visually capture an individual operating the video monitoring system 30 as well as any other individuals who may be behind that individual (e.g. in viewing sight of the monitor 32). A controller 38 is operably coupled to the monitor 32 and to the keyboard 34 and may be configured to control display of video surveillance footage on the monitor 32.

In the example shown, the controller 38 may also be configured to identify faces that are detected by the video camera 36 aimed at the space in front of the monitor 32 and the keyboard 34 in order to ascertain an identity of an operator using the monitor 32 and keyboard 34 as well as to ascertain whether there are any unauthorized individuals possibly viewing the video surveillance footage displayed on the monitor 32. The controller 38 may be further configured to display video surveillance footage on the monitor 32, including showing one or more identifiable faces in the video surveillance footage, when no unauthorized individuals are detected and to anonymize one or more identifiable faces in the video surveillance footage when one or more unauthorized individuals are detected. In some cases, the controller 38 may be further configured to issue an alert when an unauthorized individual is detected within viewing sight of the monitor 32. It will be appreciated that anonymizing one or more identifiable faces may include, for example, pixelating the individual's face/body to protect their identity. Anonymizing may also include blocking out the individual's face/body in a solid color such as black or white. In some cases, anonymizing may include fuzz balling the individual's face/body as displayed on the monitor 32. In some cases, the video footage may be anonymized for display purposes, but the original video footage may remain unchanged.

In some instances, the controller 38 may further configured to capture log in credentials used by the operator and match the log in credentials with the identity of the operator as determined by identifying a face of the operator. The controller 38 may, for example, be further configured to capture keystrokes of the operator to identify a keystroke pattern, and compare the identified keystroke pattern with a historical keystroke pattern for the operator as determined by identifying a face of the operator. The keystroke pattern may include a temporal component. The controller 38 may be further configured to anonymize one or more identifiable faces in the video surveillance footage displayed on the monitor 32 in response to a detected tampering with the video camera 36 that is aimed at the space in front of the monitor 32 and the keyboard 34.

In some instances, the controller 38 may determine or otherwise receive an indication of the identity of the operator that is based upon facial recognition. The controller 38 may determine or otherwise receive an indication of the identity of the operator that is based upon the operator's log-in credentials. The controller 38 may determine or otherwise receive an indication of the identity of the operator that is based upon keystroke tracking. In some cases, each of these indications may include a numerical indication of the probability of the accuracy of the particular indication. In some cases, the controller 38 may provide a relative weight to each of these probabilities, and may multiply each probability by its particular weight, and may sum these in order to determine whether the detected operator is the correct operator, and that there aren't any people watching over the operator's shoulder. The controller 38 may use this numerical summation to determine whether to issue an alert and anonymize the video being displayed on the monitor 32. If the numerical summation indicates a high likelihood that the operator is an authorized operator, the video will continue to be displayed on the monitor 32 in an un-obscured fashion. If the numerical summation indicates a lower likelihood that the operator is an authorized operator, the video being displayed on the monitor 32 may be obscured, and an alert may be generated.

In some instances, the controller 38 may be configured to detect possible problems with the video camera 36. For example, the controller 38 may determine that no video is being provided by the video camera 36. This may mean that the video camera 36 is malfunctioning, or has simply lost power. The controller 38 may analyze video being provided by the video camera 36 to ascertain whether at least a portion of the frame of view of the video camera 36 is being obscured. This may happen accidently, such as if something is temporarily in front of the lens of the video camera 36. This may happen intentionally, such as if someone intentionally blocks at least a part of the frame of the view of the video camera 36. For example, someone wishing to avoid detection may place a piece of paper over at least part of the lens of the video camera 36, or could spray something onto the lens, and thus obscure the lens of the video camera 36. In some cases, if the controller 38 determines that the video camera 36 is not functioning correctly, for whatever reason, the controller 38 may issue an alert and may simultaneously anonymize the video being displayed on the monitor 32.

Figure 4:
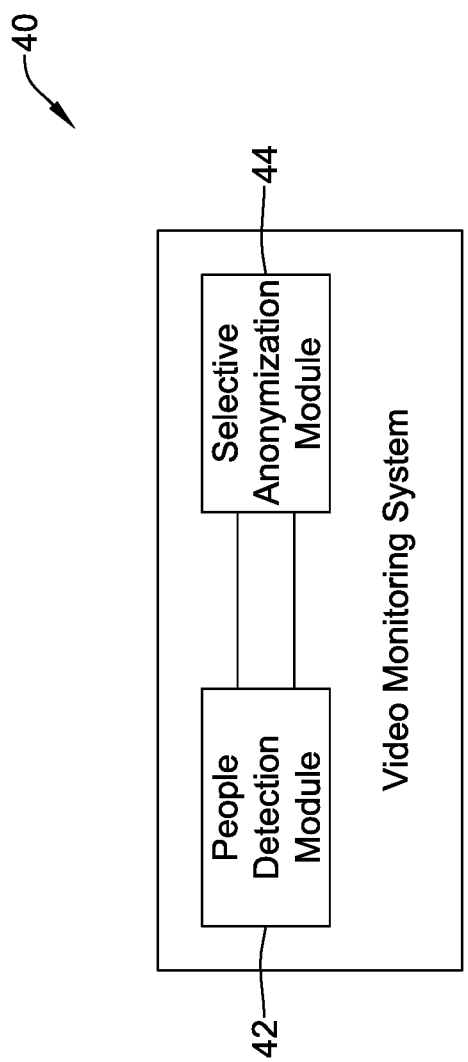
FIG. 4 is a schematic block diagram of an illustrative video monitoring system usable in the illustrative video surveillance system of FIG. 1.

In some cases, displayed video may be at least partially anonymized in response to detection of an unauthorized individual. In some instances, at least some of the individuals who might otherwise be identifiable in displayed video surveillance footage may be automatically anonymized as a matter of policy, while other individuals may not be anonymized. FIG. 4 is a schematic block diagram of a video monitoring system 40 that is configured to display video surveillance footage so that a security officer may view the video surveillance footage, the video monitoring system 40 configured to selectively anonymize at least some of the people who are visible in the video surveillance footage. The video monitoring system 40 may be considered as being an example of the video monitoring system 16 shown in FIG. 1, and may in some instances include elements and/or features of the video monitoring station 20 shown in FIG. 2. The video monitoring system 40 includes a people detection module 42 that is configured to receive video surveillance footage from one or more cameras 12, and to analyze the footage to identify one or more of people in the video surveillance footage. The video monitoring system 40 also includes a selective anonymization module 44 that is configured to selectively anonymize one or more of the people identified in the video surveillance footage based on one or more predetermined criteria.

For example, the selective anonymization module 44 may be configured to receive information pertaining to people who should not be anonymized. In some cases, a security officer operating the video monitoring system 40 may provide this information. In some cases, the people who should not be anonymized include people accused of a crime. The people who should not be anonymized may include visitors, for example. It will be appreciated that in some cases, the selective anonymization module 44 is applied when displaying the video surveillance footage via the video monitoring system 40 and does not alter the original video surveillance footage.

The people detection module 42 may, for example, use background subtraction to identify moving objects, where moving objects may be people. The people detection module 42 may use color detection to detect colors that may represent a skin color. The selective anonymization module 44 may be configured to pixelate portions of images that are believed to correspond to faces of people to be anonymized. The selective anonymization module 44 may be configured to fuzzball portions of images that are believed to correspond to faces of people to be anonymized, for example.

Figure 5:
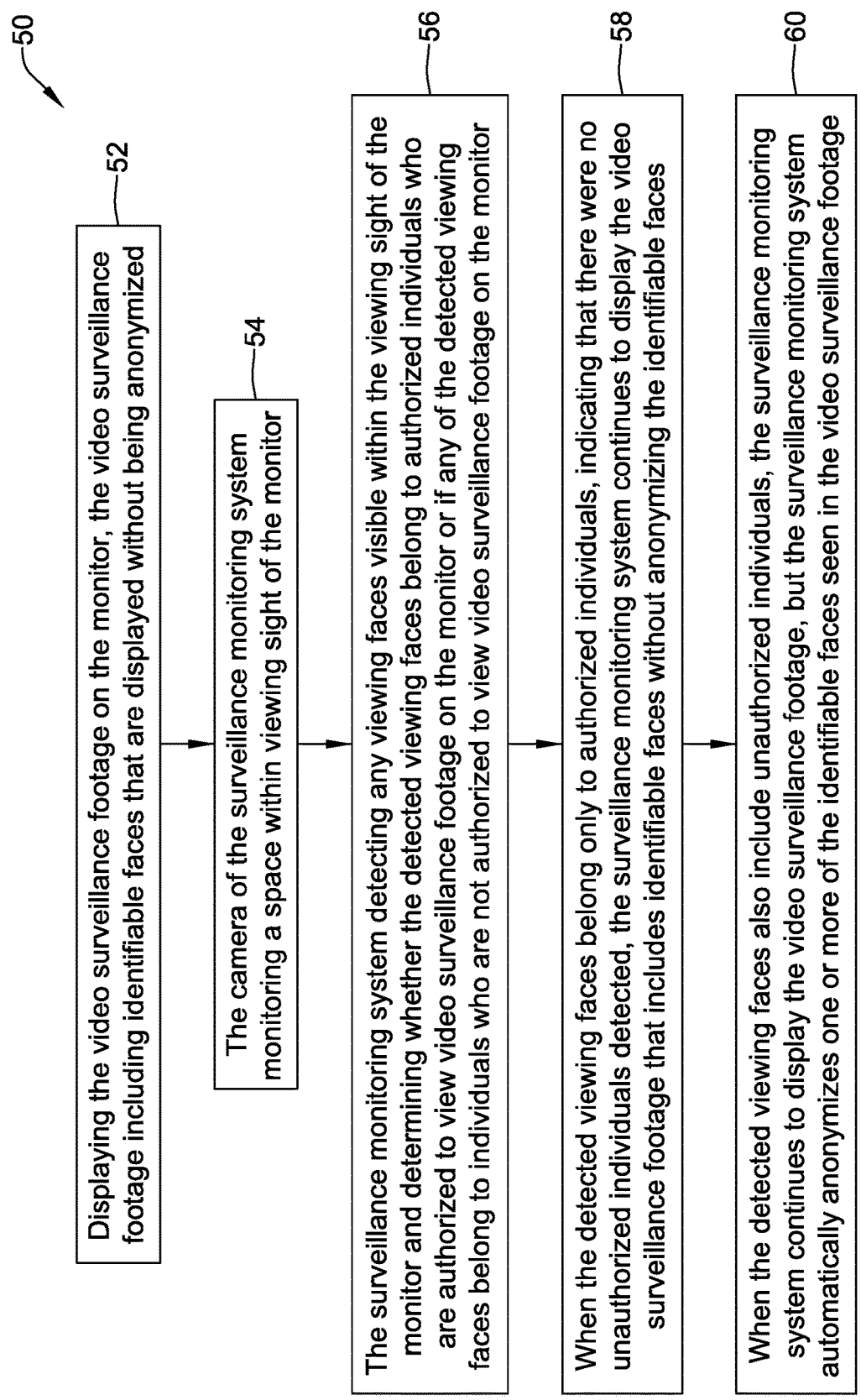
FIG. 5 is a flow diagram showing an illustrative method that may be carried out via the illustrative video monitoring systems of FIGS. 3 and 4.

FIG. 5 is a flow diagram showing an illustrative method 50 of providing privacy to individuals shown in video surveillance footage while viewing the video surveillance footage on a surveillance monitoring system such as but not limited to the video monitoring system 16, 30, 40. The video surveillance footage may be displayed on a monitor, the video surveillance footage including identifiable faces that are displayed without being anonymized, as indicated at block 52. As noted at block 54, a camera of the surveillance monitoring system may be monitoring a space within viewing sight of the monitor. In some cases, the camera may be a video camera that is aimed at the space within viewing sight of the monitor. The surveillance monitoring system may, for example, analyze a video feed from a video camera to detect any viewing faces visible within the viewing sight of the monitor.

The surveillance monitoring system may detect any viewing faces visible within the viewing sight of the monitor and may determine whether the detected viewing faces belong to authorized individuals who are authorized to view video surveillance footage on the monitor or if any of the detected viewing faces belong to individuals who are not authorized to view video surveillance footage on the monitor, as indicated at block 56. When the detected viewing faces belong only to authorized individuals, indicating that there were no unauthorized individuals detected, and as indicated at block 58, the surveillance monitoring system continues to display the video surveillance footage that includes identifiable faces without anonymizing the identifiable faces. When the detected viewing faces also include unauthorized individuals, and as indicated at block 60, the surveillance monitoring system continues to display the video surveillance footage, but the surveillance monitoring system automatically anonymizes one or more of the identifiable faces seen in the video surveillance footage.

Figure 6:
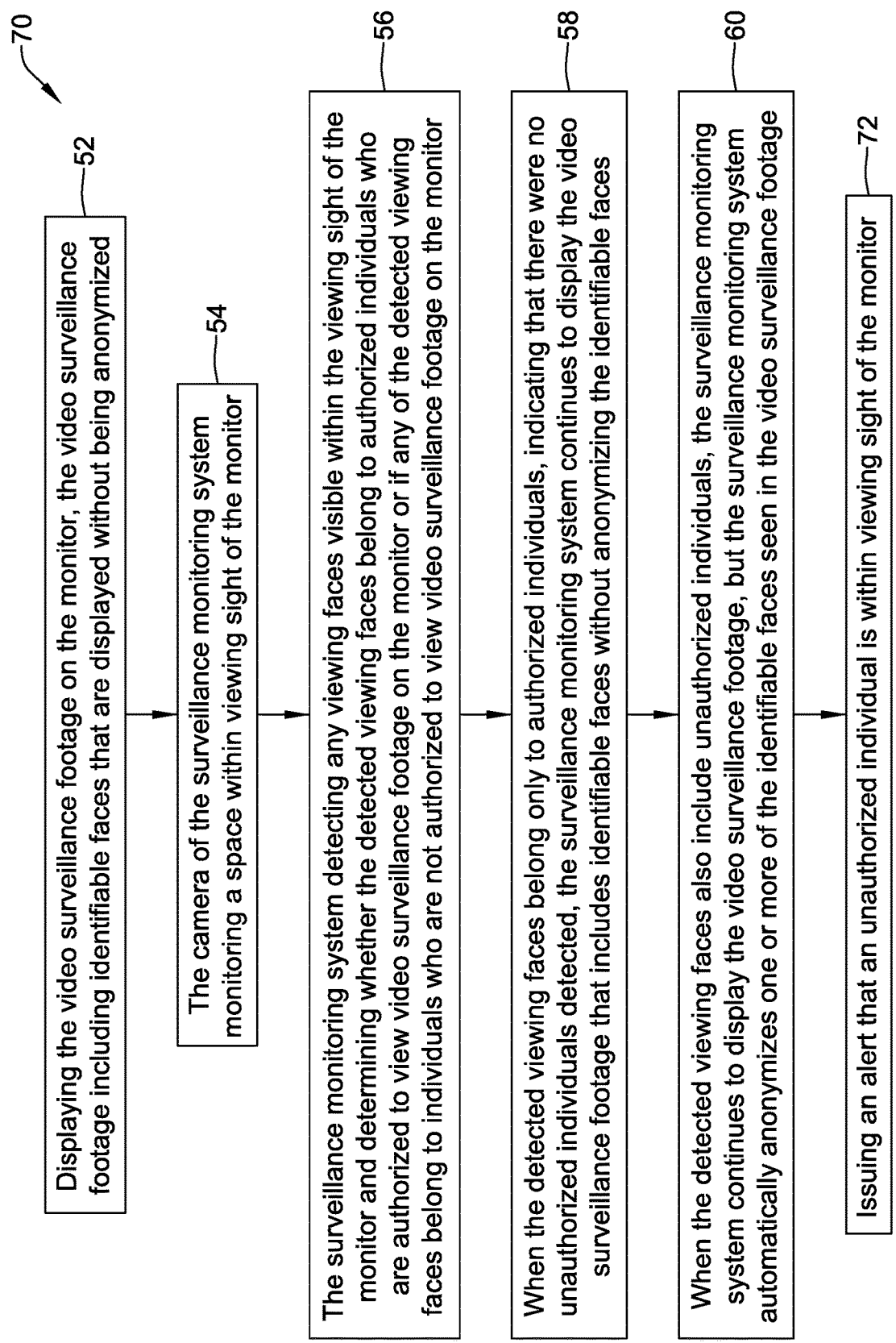
FIG. 6 is a flow diagram showing an illustrative method that may be carried out via the illustrative video monitoring systems of FIGS. 3 and 4.

FIG. 6 is a flow diagram showing an illustrative method 70 of providing privacy to individuals shown in video surveillance footage while viewing the video surveillance footage on a surveillance monitoring system such as but not limited to the video monitoring system 16, 30, 40. The video surveillance footage may be displayed on a monitor, the video surveillance footage including identifiable faces that are displayed without being anonymized, as indicated at block 52. As noted at block 54, a camera of the surveillance monitoring system may be monitoring a space within viewing sight of the monitor. The surveillance monitoring system may detect any viewing faces visible within the viewing sight of the monitor and may determine whether the detected viewing faces belong to authorized individuals who are authorized to view video surveillance footage on the monitor or if any of the detected viewing faces belong to individuals who are not authorized to view video surveillance footage on the monitor, as indicated at block 56.

When the detected viewing faces belong only to authorized individuals, indicating that there were no unauthorized individuals detected, and as indicated at block 58, the surveillance monitoring system continues to display the video surveillance footage that includes identifiable faces without anonymizing the identifiable faces. When the detected viewing faces also include unauthorized individuals, and as indicated at block 60, the surveillance monitoring system continues to display the video surveillance footage, but the surveillance monitoring system automatically anonymizes one or more of the identifiable faces seen in the video surveillance footage. In some cases, and as indicated at block 72, the surveillance monitoring system may issue an alert that an unauthorized individual is within viewing sight of the monitor. The alert may, for example, be an auditory alert and/or a visible alert.

Figure 7:
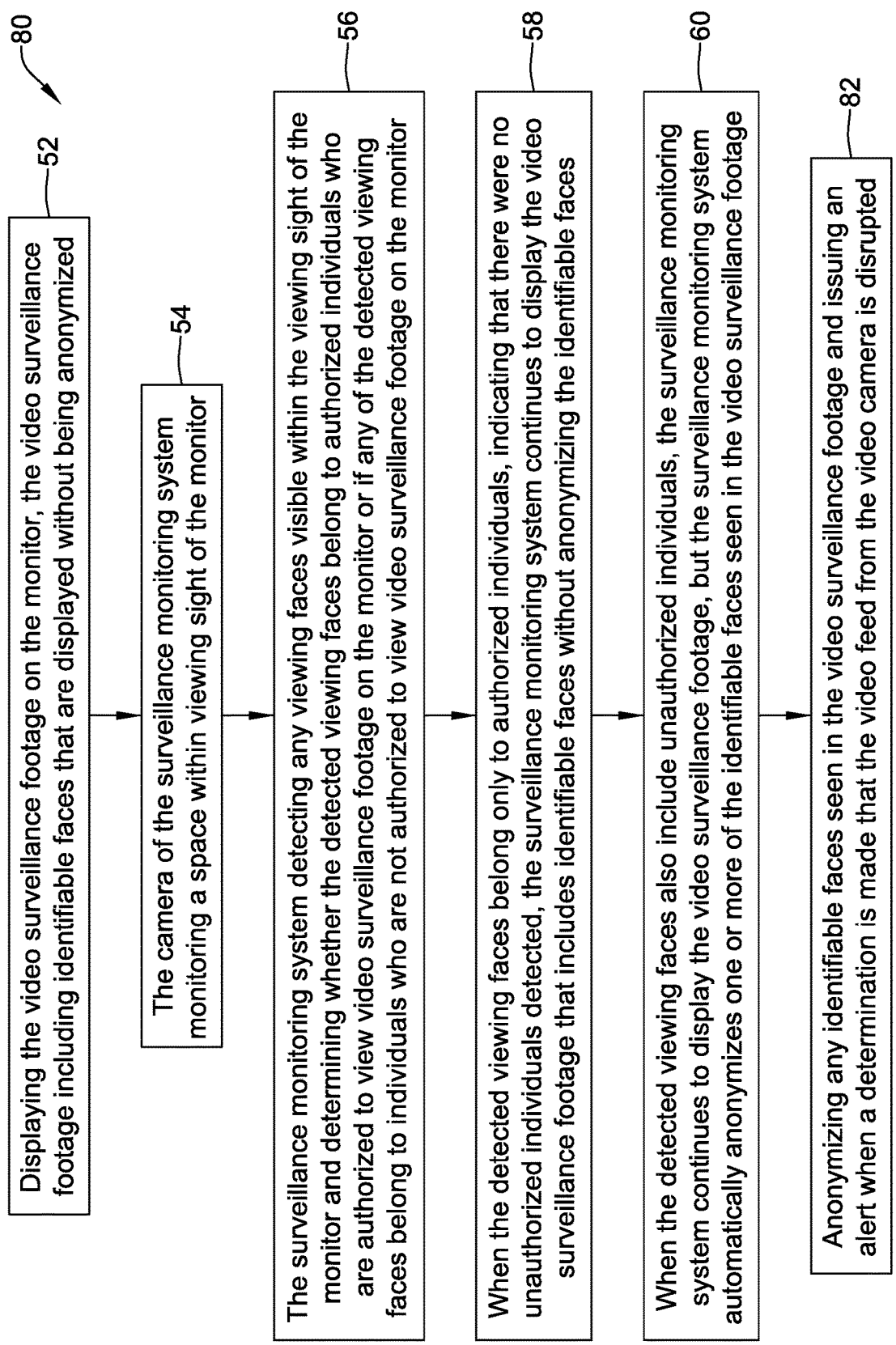
FIG. 7 is a flow diagram showing an illustrative method that may be carried out via the illustrative video monitoring systems of FIGS. 3 and 4.

FIG. 7 is a flow diagram showing an illustrative method 80 of providing privacy to individuals shown in video surveillance footage while viewing the video surveillance footage on a surveillance monitoring system such as but not limited to the video monitoring system 16, 30, 40. The video surveillance footage may be displayed on a monitor, the video surveillance footage including identifiable faces that are displayed without being anonymized, as indicated at block 52. As noted at block 54, a camera of the surveillance monitoring system may be monitoring a space within viewing sight of the monitor. The surveillance monitoring system may detect any viewing faces visible within the viewing sight of the monitor and may determine whether the detected viewing faces belong to authorized individuals who are authorized to view video surveillance footage on the monitor or if any of the detected viewing faces belong to individuals who are not authorized to view video surveillance footage on the monitor, as indicated at block 56.

When the detected viewing faces belong only to authorized individuals, indicating that there were no unauthorized individuals detected, and as indicated at block 58, the surveillance monitoring system continues to display the video surveillance footage that includes identifiable faces without anonymizing the identifiable faces. When the detected viewing faces also include unauthorized individuals, and as indicated at block 60, the surveillance monitoring system continues to display the video surveillance footage, but the surveillance monitoring system automatically anonymizes one or more of the identifiable faces seen in the video surveillance footage. In some instances, as indicated at block 82, any identifiable faces seen in the video surveillance footage may be anonymized and an alert may be issued when a determination is made that the video feed from the video camera is disrupted.

Figure 8:
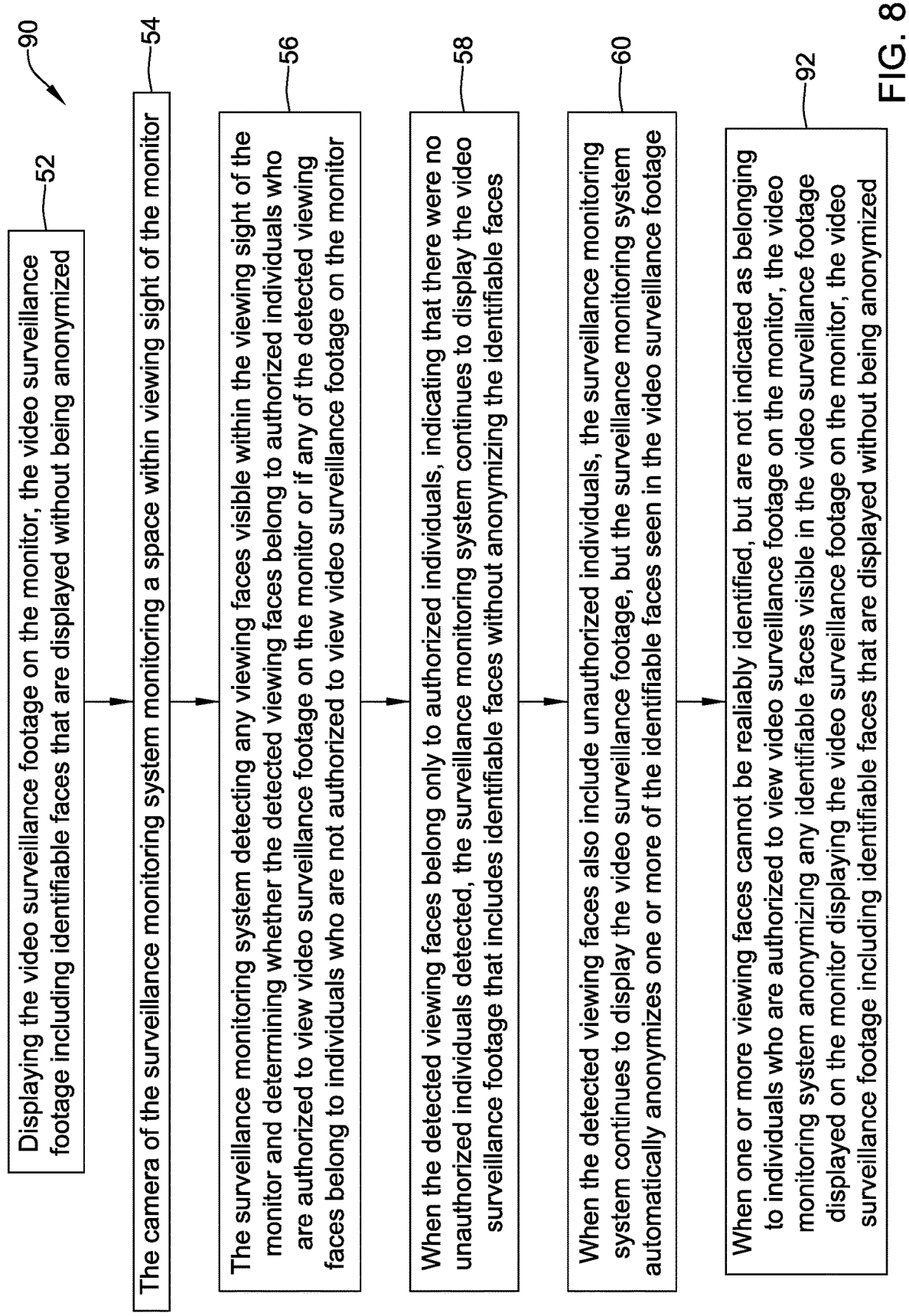
FIG. 8 is a flow diagram showing an illustrative method that may be carried out via the illustrative video monitoring systems of FIGS. 3 and 4.

FIG. 8 is a flow diagram showing an illustrative method 90 of providing privacy to individuals shown in video surveillance footage while viewing the video surveillance footage on a surveillance monitoring system such as but not limited to the video monitoring system 16, 30, 40. The video surveillance footage may be displayed on a monitor, the video surveillance footage including identifiable faces that are displayed without being anonymized, as indicated at block 52. As noted at block 54, a camera of the surveillance monitoring system may be monitoring a space within viewing sight of the monitor. The surveillance monitoring system may detect any viewing faces visible within the viewing sight of the monitor and may determine whether the detected viewing faces belong to authorized individuals who are authorized to view video surveillance footage on the monitor or if any of the detected viewing faces belong to individuals who are not authorized to view video surveillance footage on the monitor, as indicated at block 56.

When the detected viewing faces belong only to authorized individuals, indicating that there were no unauthorized individuals detected, and as indicated at block 58, the surveillance monitoring system continues to display the video surveillance footage that includes identifiable faces without anonymizing the identifiable faces. When the detected viewing faces also include unauthorized individuals, and as indicated at block 60, the surveillance monitoring system continues to display the video surveillance footage, but the surveillance monitoring system automatically anonymizes one or more of the identifiable faces seen in the video surveillance footage. In some cases, when one or more viewing faces cannot be reliably identified, but are not indicated as belonging to individuals who are authorized to view video surveillance footage on the monitor, and as indicated at block 92, the video monitoring system may anonymize any identifiable faces visible in the video surveillance footage displayed on the monitor.

Figure 9:
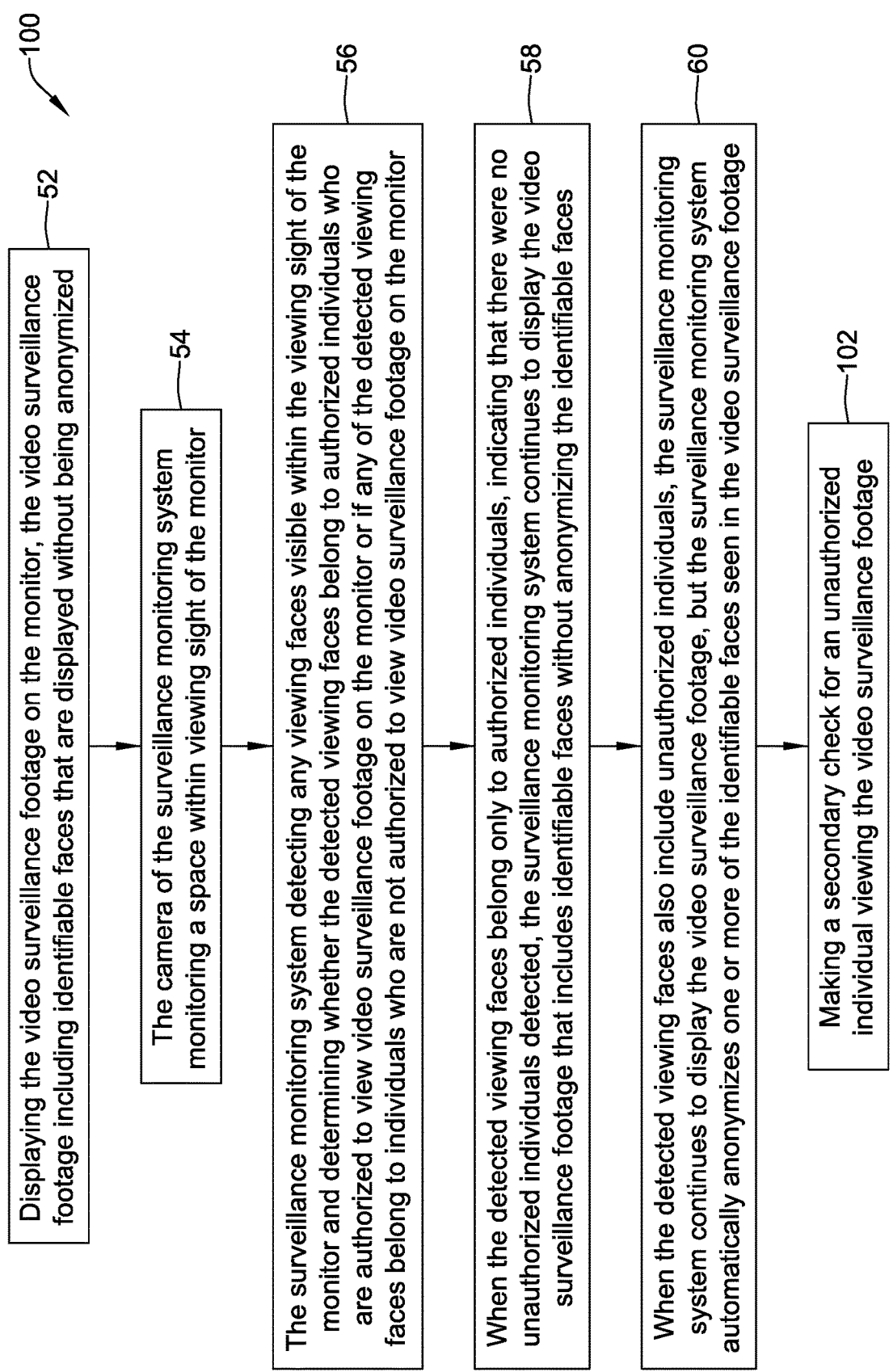
FIG. 9 is a flow diagram showing an illustrative method that may be carried out via the illustrative video monitoring systems of FIGS. 3 and 4.

FIG. 9 is a flow diagram showing an illustrative method 100 of providing privacy to individuals shown in video surveillance footage while viewing the video surveillance footage on a surveillance monitoring system such as but not limited to the video monitoring system 16, 30, 40. The video surveillance footage may be displayed on a monitor, the video surveillance footage including identifiable faces that are displayed without being anonymized, as indicated at block 52. As noted at block 54, a camera of the surveillance monitoring system may be monitoring a space within viewing sight of the monitor. The surveillance monitoring system may detect any viewing faces visible within the viewing sight of the monitor and may determine whether the detected viewing faces belong to authorized individuals who are authorized to view video surveillance footage on the monitor or if any of the detected viewing faces belong to individuals who are not authorized to view video surveillance footage on the monitor, as indicated at block 56.

When the detected viewing faces belong only to authorized individuals, indicating that there were no unauthorized individuals detected, and as indicated at block 58, the surveillance monitoring system continues to display the video surveillance footage that includes identifiable faces without anonymizing the identifiable faces. When the detected viewing faces also include unauthorized individuals, and as indicated at block 60, the surveillance monitoring system continues to display the video surveillance footage, but the surveillance monitoring system automatically anonymizes one or more of the identifiable faces seen in the video surveillance footage.

In some cases, and as indicated at block 102, a secondary check may be made for an unauthorized individual viewing the video surveillance footage. A secondary check may, for example, include comparing an identification of an operator at the monitor and keyboard as identified via facial recognition with log in credentials used by the operator to log into the video monitoring system. As another example, a secondary check may include monitoring the operator's key strokes, and comparing the operator's key strokes to a known key stroke pattern for a particular authorized operator as identified via facial recognition and/or via their log in credentials.

Figure 10:
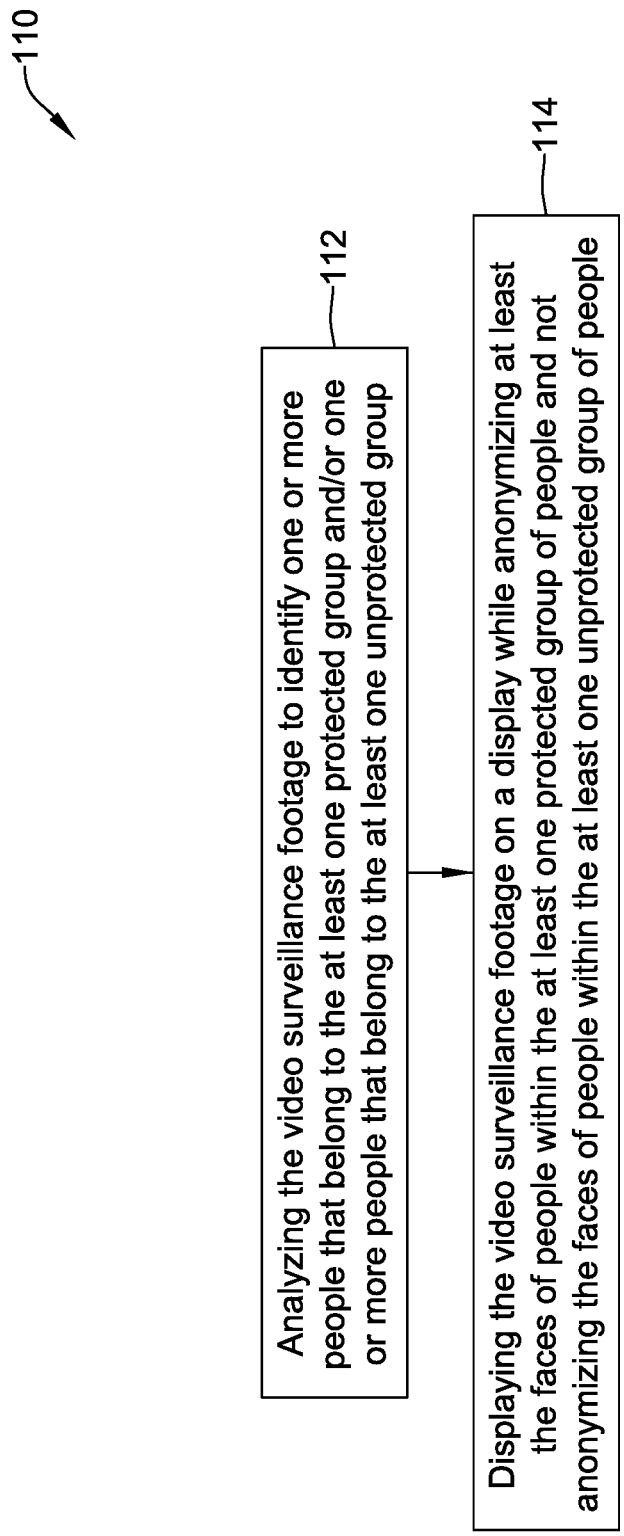
FIG. 10 is a flow diagram showing an illustrative method that may be carried out via the illustrative video monitoring systems of FIGS. 3 and 4.

FIG. 10 is a flow diagram showing an illustrative method 110 of displaying video surveillance footage on a monitor that can include footage of people, where the people include at least one protected group of people that are to remain anonymized when displaying the video surveillance footage to an operator and at least one unprotected group of people that are not to be anonymized when displaying the video surveillance footage to the operator. A person's job category may determine whether they are in the at least one protected group of people or the at least one unprotected group of people. As an example, perhaps security officers, or custodial staff are in the at least one unprotected group of people while other categories of employees are in the at least one protected group of people. In some cases, a person's legal status may determine whether they are in the at least one protected group of people or the at least one unprotected group of people. As an example, a blacklisted person, or a person otherwise accused of a crime, may fall into the at least one unprotected group of people. These are just examples.

As indicated at block 112, the video surveillance footage may be analyzed to identify one or more people that belong to the at least one protected group and/or one or more people that belong to the at least one unprotected group. As noted at block 114, the video surveillance footage may be displayed on a display while anonymizing at least the faces of people within the at least one protected group of people and not anonymizing the faces of people within the at least one unprotected group of people.

Figure 11:
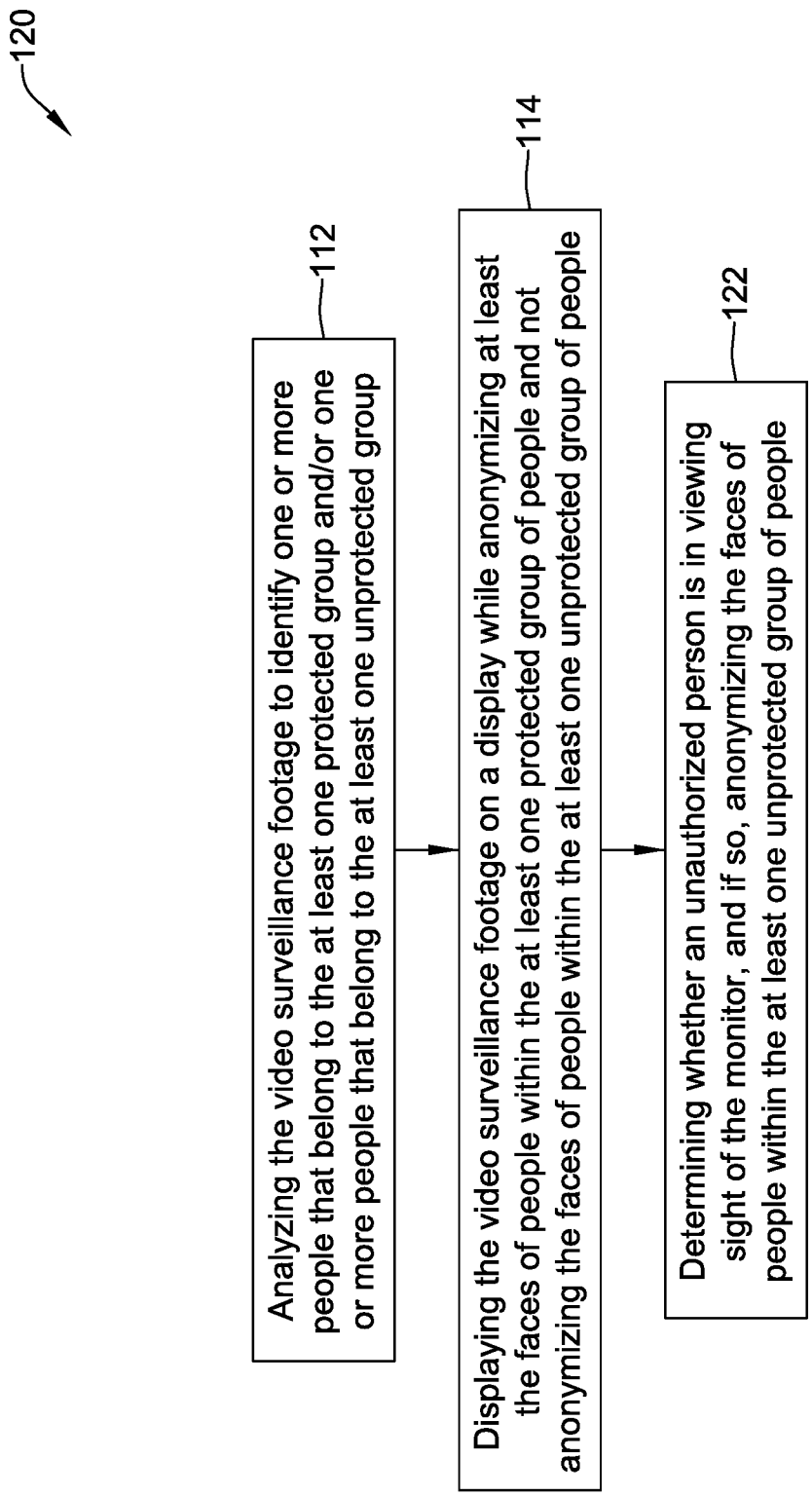
FIG. 11 is a flow diagram showing an illustrative method that may be carried out via the illustrative video monitoring systems of FIGS. 3 and 4.

FIG. 11 is a flow diagram showing an illustrative method 120 of displaying video surveillance footage on a monitor that can include footage of people, where the people include at least one protected group of people that are to remain anonymized when displaying the video surveillance footage to an operator and at least one unprotected group of people that are not to be anonymized when displaying the video surveillance footage to the operator. As indicated at block 112, the video surveillance footage may be analyzed to identify one or more people that belong to the at least one protected group and/or one or more people that belong to the at least one unprotected group. As noted at block 114, the video surveillance footage may be displayed on a display while anonymizing at least the faces of people within the at least one protected group of people and not anonymizing the faces of people within the at least one unprotected group of people. In some cases, and as indicated at block 122, a determination may be made whether an unauthorized person is in viewing sight of the monitor, and if so, the faces of people within the at least one unprotected group of people may be anonymized.

Figure 12:
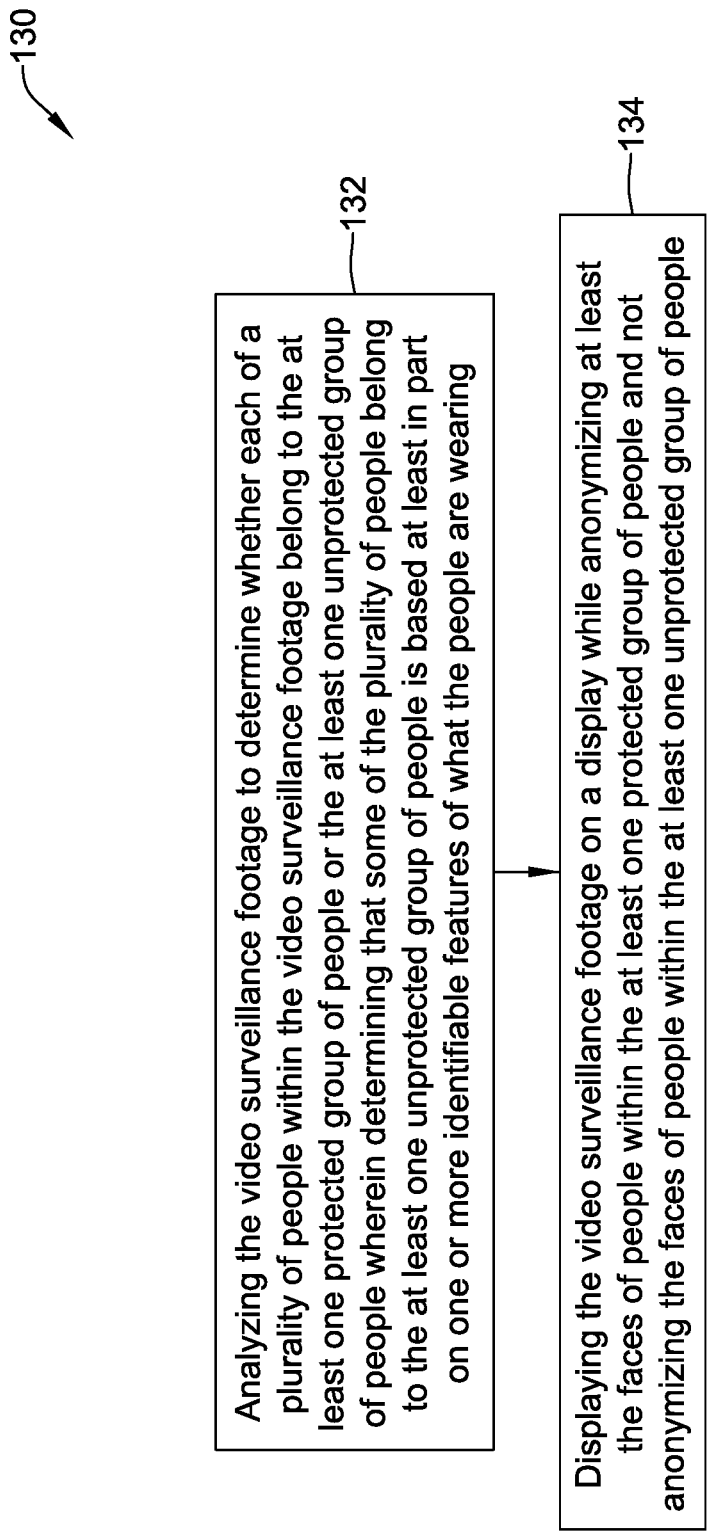
FIG. 12 is a flow diagram showing an illustrative method that may be carried out via the illustrative video monitoring systems of FIGS. 3 and 4.

FIG. 12 is a flow diagram showing an illustrative method 130 of displaying video surveillance footage that can includes footage of people, where the people include at least one protected group of people that are to remain anonymized when displaying the video surveillance footage and at least one unprotected group of people that are not to be anonymized when displaying the video surveillance footage. As indicated at block 132, the video surveillance footage may be analyzed to determine whether each of a plurality of people within the video surveillance footage belong to the at least one protected group of people or the at least one unprotected group of people. In some instances, determining that some of the plurality of people belong to the at least one unprotected group of people may be based at least part on one or more identifiable features of what the people are wearing. For example, one or more identifiable features of what the people are wearing may include a badge and/or a uniform.

As indicated at block 134, the video surveillance footage may be displayed on a display while anonymizing at least the faces of people within the at least one protected group of people and not anonymizing the faces of people within the at least one unprotected group of people. In some cases, the at least one protected group of people include one or more employee classifications while the at least one unprotected group of people may include one or more other employee classifications. As an example, the at least one unprotected group of people may include security officers. As another example, the at least one unprotected group of people may include custodians and/or housekeeping individuals.

Figure 13:
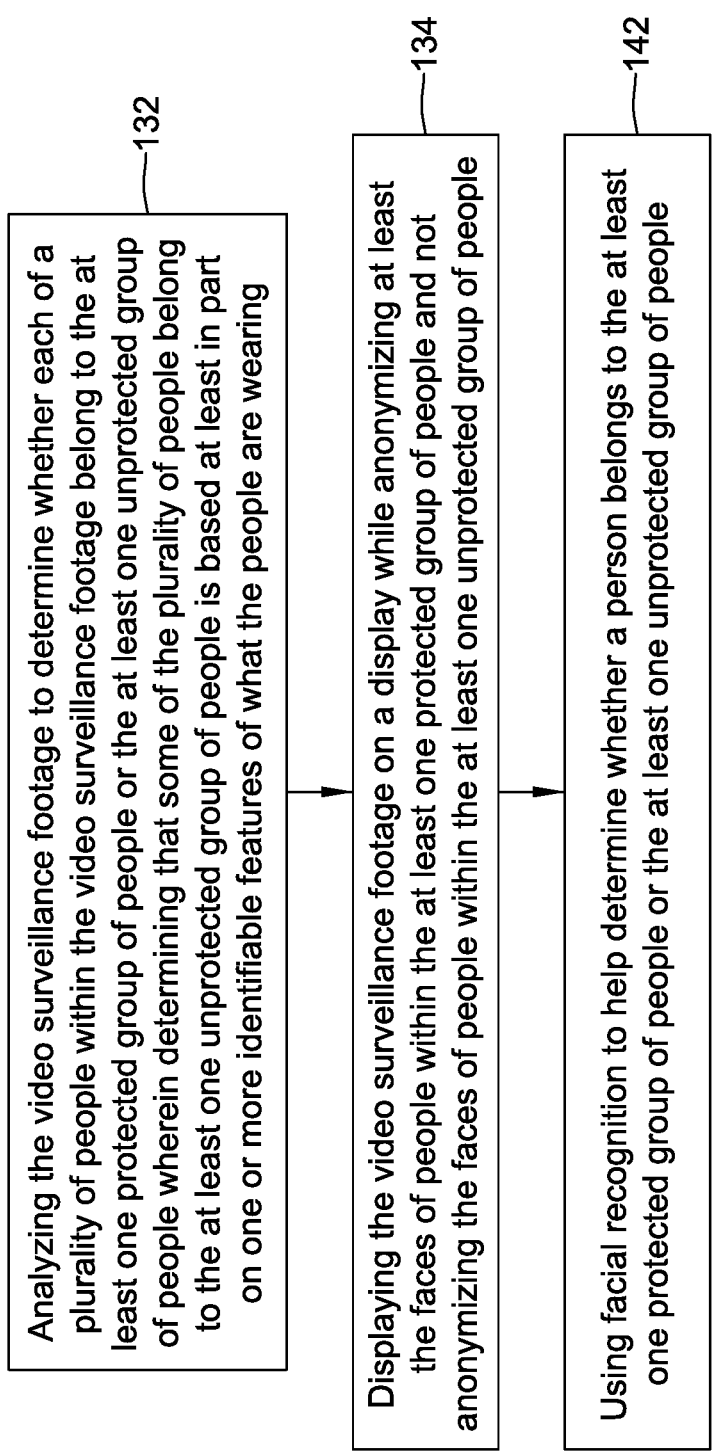
FIG. 13 is a flow diagram showing an illustrative method that may be carried out via the illustrative video monitoring systems of FIGS. 3 and 4.

FIG. 13 is a flow diagram showing an illustrative method 140 of displaying video surveillance footage that can includes footage of people, where the people include at least one protected group of people that are to remain anonymized when displaying the video surveillance footage and at least one unprotected group of people that are not to be anonymized when displaying the video surveillance footage. As indicated at block 132, the video surveillance footage may be analyzed to determine whether each of a plurality of people within the video surveillance footage belong to the at least one protected group of people or the at least one unprotected group of people. In some instances, determining that some of the plurality of people belong to the at least one unprotected group of people may be based at least part on one or more identifiable features of what the people are wearing.

As indicated at block 134, the video surveillance footage may be displayed on a display while anonymizing at least the faces of people within the at least one protected group of people and not anonymizing the faces of people within the at least one unprotected group of people. In some cases, as indicated at block 142, facial recognition may be used to help determine whether a person belongs to the at least one protected group of people or the at least one unprotected group of people.

Figure 14:
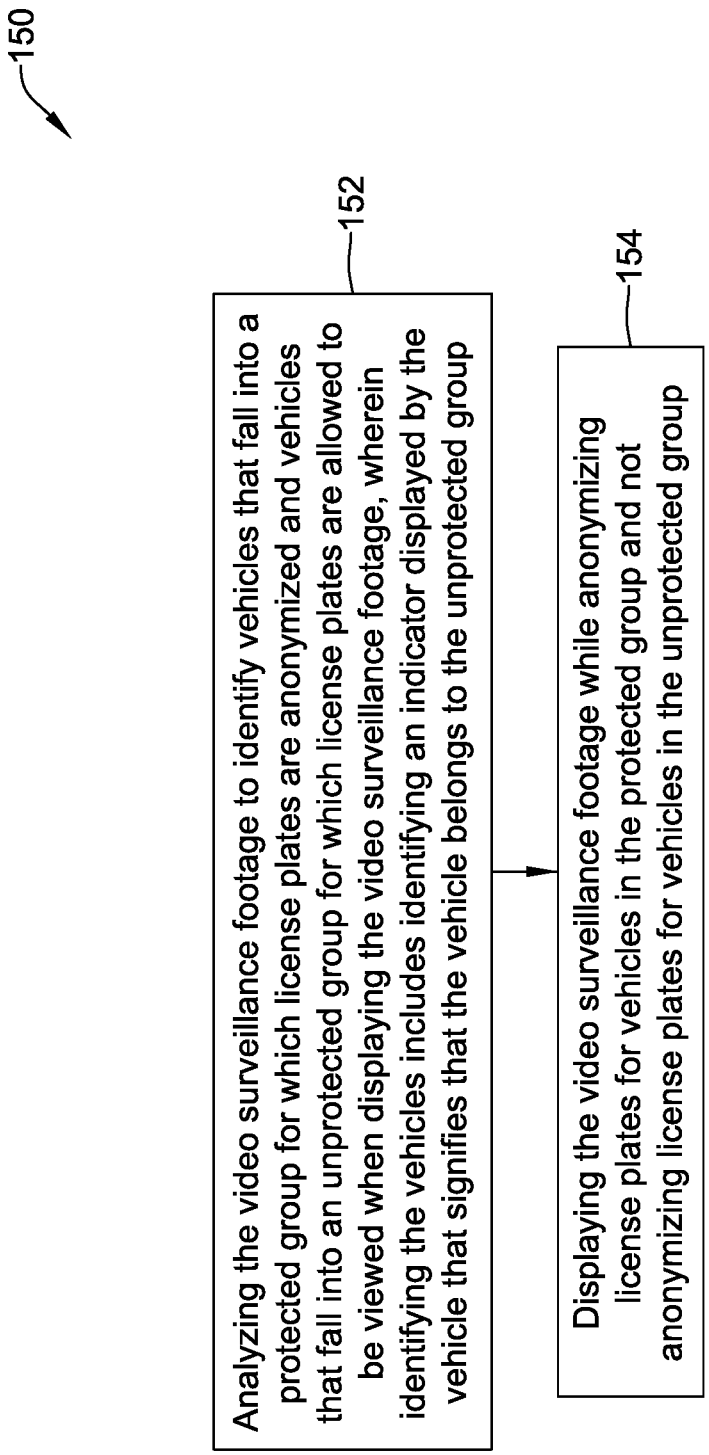
FIG. 14 is a flow diagram showing an illustrative method that may be carried out via the illustrative video monitoring systems of FIGS. 3 and 4.

In some cases, there may be a desire to protect the identity of motor vehicles as well. FIG. 14 is a flow diagram showing an illustrative method 150 of displaying video surveillance footage that can includes footage of motor vehicles having license plates. In some cases, vehicles may be detected using background subtraction or AI-based vehicle detection. As indicated at block 152, the video surveillance footage may be analyzed to identify vehicles that fall into a protected group for which license plates are anonymized and vehicles that fall into an unprotected group for which license plates are allowed to be viewed when displaying the video surveillance footage.

In some cases, identifying the vehicles may include identifying an indicator displayed by the vehicle that signifies that the vehicle belongs to the unprotected group. The indicator may be an indicia that is placed on the vehicle. The indicator may be a sticker that includes a recognizable indicia. For example, the recognizable indicia may be a company name, or a company logo. The indicator may simply be the license plate of each vehicle. As indicated at block 154, the video surveillance footage may be displayed while anonymizing license plates for vehicles in the protected group and not anonymizing license plates for vehicles in the unprotected group.

Figure 15:
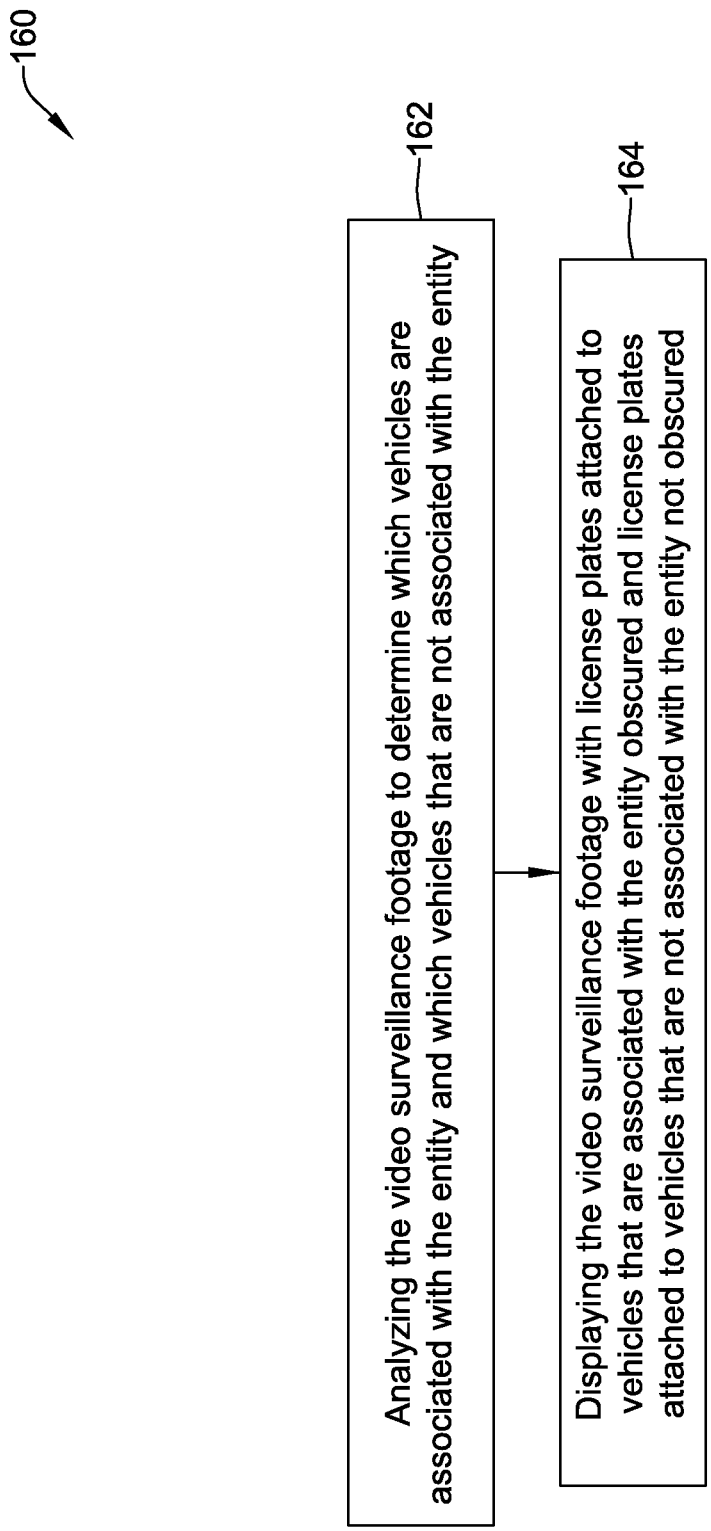
FIG. 15 is a flow diagram showing an illustrative method that may be carried out via the illustrative video monitoring systems of FIGS. 3 and 4.

FIG. 15 is a flow diagram of an illustrative method 160 of displaying video surveillance footage that includes footage of motor vehicles having license plates, the motor vehicles including vehicles associated with an entity and vehicles not associated with the entity. As indicated at block 162, the video surveillance footage may be analyzed to determine which vehicles are associated with the entity and which vehicles that are not associated with the entity. In some cases, determining which vehicles are associated with the entity may include identifying an indicia placed on the vehicle. The indicia may include a sticker bearing a company name or logo. The indicia may, for example, be the license plate of each vehicle.

As indicated at block 164, the video surveillance footage may be displayed with license plates attached to vehicles that are associated with the entity obscured and license plates attached to vehicles that are not associated with the entity are not obscured. For example, vehicles that are associated with the entity may include vehicles driven by employees of a corporate entity. The vehicles that are associated with the entity may include vehicles owned by a corporate entity. The vehicles that are not associated with the entity may include vehicles driven by visitors. In some instances, all license plates may be obscured. In some cases, all license plates may be displayed. These are just examples.

Figure 16:
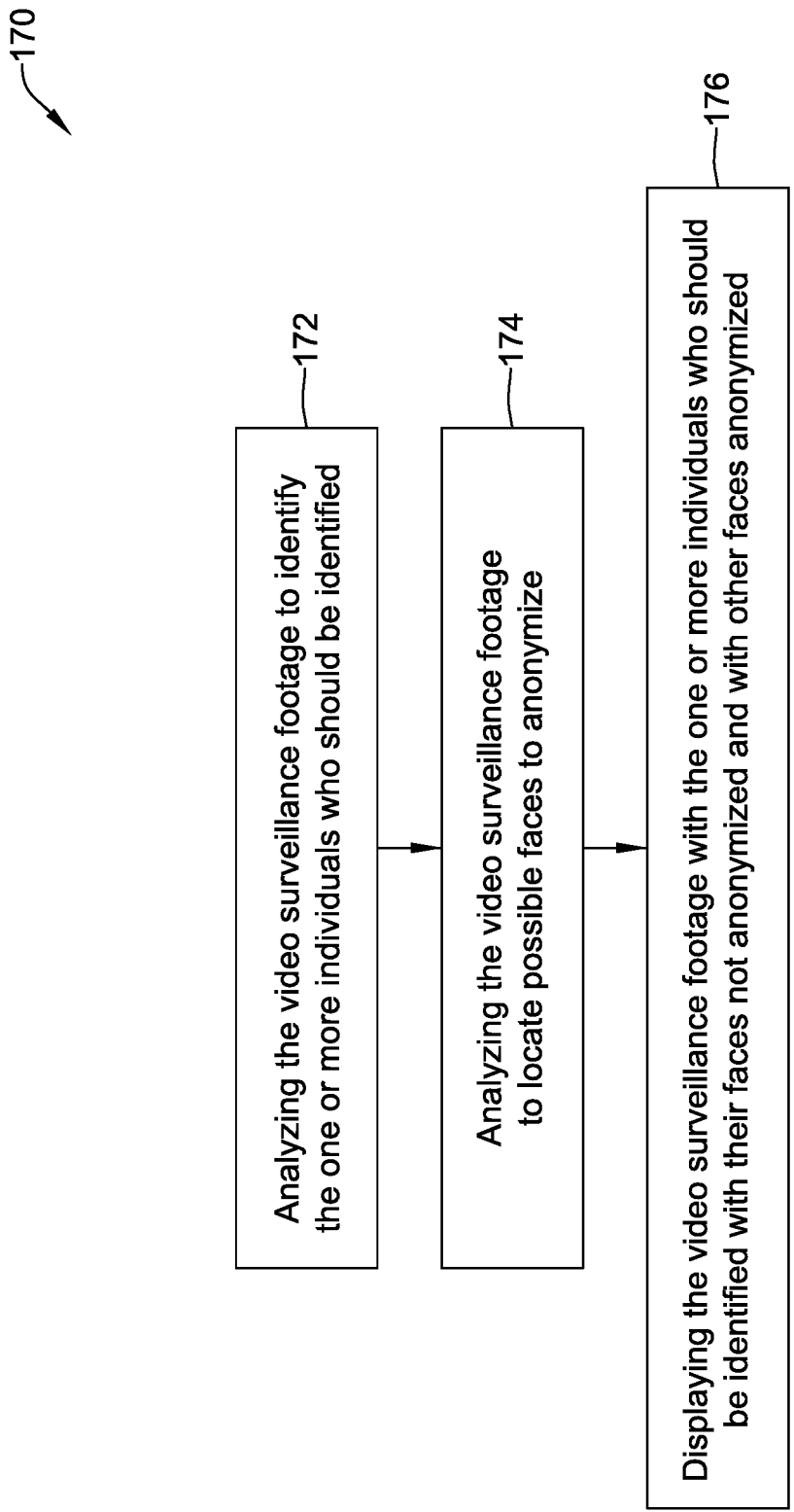
FIG. 16 is a flow diagram showing an illustrative method that may be carried out via the illustrative video monitoring systems of FIGS. 3 and 4.

FIG. 16 is a flow diagram showing an illustrative method 170 of displaying video surveillance footage that includes footage of one or more individuals who should be identifiable in the footage while remaining people should be anonymized in the footage when displayed. As indicated at block 172, the video surveillance footage may be analyzed to identify the one or more individuals who should be identified. In some cases, identifying the one or more individuals who should be identifiable may include using facial recognition. As indicated at block 174, the video surveillance footage may be analyzed to locate possible faces to anonymize. In some instances, locating possible faces to anonymize may include using facial recognition. Locating possible faces to anonymize may, for example, include using background subtraction to locate possible movement, where movement may be denoted as possibly indicating a person. Locating possible faces to anonymize may include using color matching to locate possible human skin tones.

As indicated at block 176, the video surveillance footage may be displayed with the one or more individuals who should be identified with their faces not anonymized and with other faces anonymized. The individuals who should be identifiable in the footage may include one or more individuals accused of a crime, and faces to anonymize may include one or more victims of the crime. The individuals who should be identifiable in the footage may include one or more visitors, and faces to anonymize may include employees.

In some cases, video footage may be analyzed over a length of video footage, covering a period of time, when analyzing the video surveillance footage. When an individual is identified at two or more distinct times within a length of video footage, that individual may be deemed to be identified at all points within the length of video footage. In some cases, that individual is not anonymized at all at any time during the length of video footage when that individual is determined to be one of the one or more individuals who should be identifiable and is otherwise anonymized at all times during the length of video footage when that individual is not one of the one or more individuals who should be identifiable.

Figure 17:
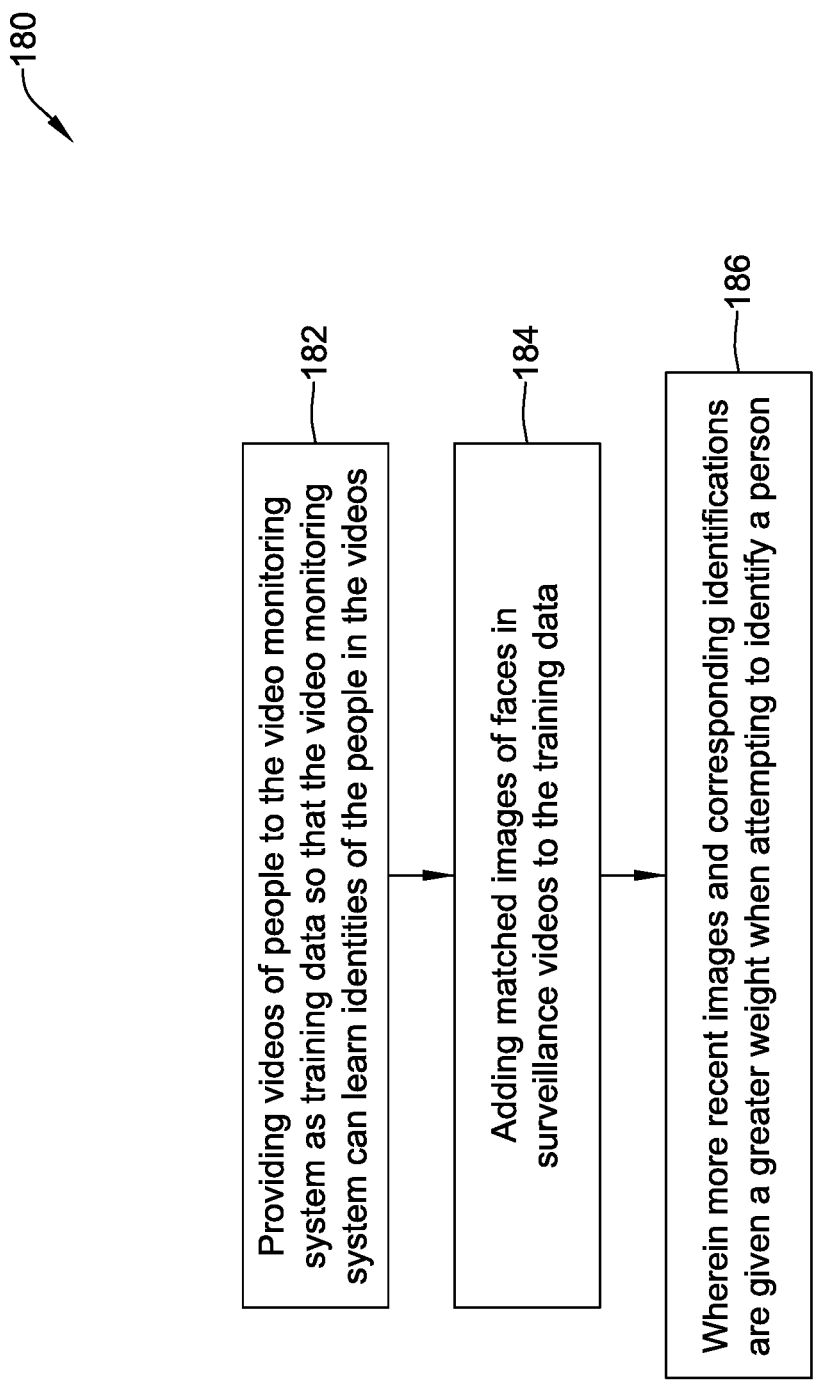
FIG. 17 is a flow diagram showing an illustrative method that may be carried out via the illustrative video monitoring systems of FIGS. 3 and 4.

FIG. 17 is a flow diagram showing an illustrative method 180 of training a video monitoring system that is used to display video surveillance footage so that a security officer may view the video surveillance footage, the video monitoring system configured to selectively anonymize at least some of the people who are visible in the video surveillance footage. As indicated at block 182, videos of people may be provided to the video monitoring system as training data so that the video monitoring system can learn identities of the people in the videos. Matched images of faces in surveillance videos may be added to the training data as indicated at block 184. As indicated at block 186, in some cases, more recent images and corresponding identifications are given a greater weight when attempting to identify a person.

FIG. 18 is a flow diagram showing an illustrative method 190 that may be used by the video monitoring system 30 when tracking one or more people within a video. As indicated at block 192, skin color detection may be performed on an input video or input images. Any pixels that appear to be a color that matches a possible human skin color may be anonymized. Separately, and as indicated at block 194, facial recognition may be performed on at least some of the individuals shown in the input video or input images. In some cases, and as noted at block 196, the faces of individuals who need to be visible may be provided to the facial recognition system. As indicated at block 198, face tracking may be performed for detected and recognized faces. A back tracking algorithm may be used, as indicated at block 200. For example, if a person is seen through a number of frames, but is not positively identified until a subsequent frame, that identification is used to label previous frames within a track. As an illustrative but non-limiting example, say a face is detected at frame F, but is not identified until frame F+10. In this situation, the detected face is replaced with the person's Person ID and/or name within each frame beginning with Frame F. As indicated at block 202, the system may obtain all regions that include valid Person IDs. These may be considered as being the faces in the image(s) of the listed people (as referenced at block 196). As indicated at block 204, the regions with valid Person IDs may be un-anonymized while all other images remain anonymized.

Additional Examples

An example of the disclosure includes a method of providing privacy to individuals shown in video surveillance footage while viewing the video surveillance footage on a surveillance monitoring system, wherein the video surveillance footage includes a monitor, a keyboard, and a camera. The method includes displaying the video surveillance footage on the monitor, the video surveillance footage including identifiable faces that are displayed without being anonymized and the camera of the surveillance monitoring system monitoring a space within viewing sight of the monitor. The surveillance monitoring system detects any viewing faces visible within the viewing sight of the monitor and determines whether the detected viewing faces belong to authorized individuals who are authorized to view video surveillance footage on the monitor or if any of the detected viewing faces belong to individuals who are not authorized to view video surveillance footage on the monitor. When the detected viewing faces belong only to authorized individuals, indicating that there were no unauthorized individuals detected, the surveillance monitoring system continues to display the video surveillance footage that includes identifiable faces without anonymizing the identifiable faces. When the detected viewing faces also include unauthorized individuals, the surveillance monitoring system continues to display the video surveillance footage, but the surveillance monitoring system automatically anonymizes one or more of the identifiable faces seen in the video surveillance footage.

Alternatively or additionally, the method may further include the surveillance monitoring system issuing an alert that an unauthorized individual is within viewing sight of the monitor.

Alternatively or additionally, the alert may include an auditory alert and/or a visible alert.

Alternatively or additionally, the camera may include a video camera aimed at the space within viewing sight of the monitor.

Alternatively or additionally, the surveillance monitoring system may analyze a video feed from a video camera to detect any viewing faces visible within the viewing sight of the monitor.

Alternatively or additionally, the method may further include anonymizing any identifiable faces seen in the video surveillance footage and issuing an alert when a determination is made that the video feed from the video camera is disrupted.

Alternatively or additionally, the method may further include the video monitoring system anonymizing any identifiable faces visible in the video surveillance footage displayed on the monitor when one or more viewing faces cannot be reliably identified, but are not indicated as belonging to individuals who are authorized to view video surveillance footage on the monitor.

Alternatively or additionally, the method may further include making a secondary check for an unauthorized individual viewing the video surveillance footage.

Alternatively or additionally, making the secondary check may include comparing an identification of an operator at the monitor and keyboard as identified via facial recognition with log in credentials used by the operator to log into the video monitoring system.

Alternatively or additionally, making the secondary check may include monitoring the operator's key strokes, and comparing the operator's key strokes to a known key stroke pattern for a particular authorized operator as identified via facial recognition and/or via their log in credentials.

Another example of the disclosure includes a video monitoring system configured to provide privacy for individuals shown in video surveillance footage while displaying the video surveillance footage on the video monitoring system. The video monitoring system includes a monitor configured to display video surveillance footage, a keyboard, a video camera that is aimed at a space in front of the monitor and the keyboard and a controller operably coupled to the monitor and to the keyboard, the controller configured to control display of video surveillance footage on the monitor. The controller is further configured to identify faces detected by the video camera aimed at the space in front of the monitor and the keyboard in order to ascertain an identity of an operator using the monitor and keyboard as well as to ascertain whether there are any unauthorized individuals possibly viewing the video surveillance footage displayed on the monitor. The controller is further configured to display video surveillance footage on the monitor, including showing one or more identifiable faces in the video surveillance footage, when no unauthorized individuals are detected and to anonymize one or more identifiable faces in the video surveillance footage when one or more unauthorized individuals are detected.

Alternatively or additionally, the controller may be further configured to capture log in credentials used by the operator and match the log in credentials with the identity of the operator as determined by identifying a face of the operator.

Alternatively or additionally, the controller may be further configured to capture keystrokes of the operator to identify a keystroke pattern, and compare the identified keystroke pattern with a historical keystroke pattern for the operator as determined by identifying a face of the operator.

Alternatively or additionally, the controller may be further configured to anonymize one or more identifiable faces in the video surveillance footage displayed on the monitor in response to a detected tampering with the video camera that is aimed at the space in front of the monitor and the keyboard.

Alternatively or additionally, the controller may be further configured to issue an alert when an unauthorized individual is detected within viewing sight of the monitor.

Another example of the disclosure includes a method of displaying video surveillance footage on a monitor that can include footage of people, where the people include at least one protected group of people that are to remain anonymized when displaying the video surveillance footage to an operator and at least one unprotected group of people that are not to be anonymized when displaying the video surveillance footage to the operator. The method includes analyzing the video surveillance footage to identify one or more people that belong to the at least one protected group and/or one or more people that belong to the at least one unprotected group and displaying the video surveillance footage on a display while anonymizing at least the faces of people within the at least one protected group of people and not anonymizing the faces of people within the at least one unprotected group of people.

Alternatively or additionally, the method may further include determining whether an unauthorized person is in viewing sight of the monitor, and if so, anonymizing the faces of people within the at least one unprotected group of people.

Alternatively or additionally, a person's job category may determine whether they are in the at least one protected group of people or the at least one unprotected group of people.

Alternatively or additionally, a person's legal status may determine whether they are in the at least one protected group of people or the at least one unprotected group of people.

Alternatively or additionally, a blacklisted person may be in the at least one unprotected group of people.

Another example of the disclosure includes a method of displaying video surveillance footage that can includes footage of people, where the people include at least one protected group of people that are to remain anonymized when displaying the video surveillance footage and at least one unprotected group of people that are not to be anonymized when displaying the video surveillance footage. The method includes analyzing the video surveillance footage to determine whether each of a plurality of people within the video surveillance footage belong to the at least one protected group of people or the at least one unprotected group of people, and determining that some of the plurality of people belong to the at least one unprotected group of people is based at least part on one or more identifiable features of what the people are wearing. The method includes displaying the video surveillance footage on a display while anonymizing at least the faces of people within the at least one protected group of people and not anonymizing the faces of people within the at least one unprotected group of people.

Alternatively or additionally, the at least one protected group of people may include one or more employee classifications.

Alternatively or additionally, the at least one unprotected group of people may include one or more other employee classifications.

Alternatively or additionally, the one or more identifiable features of what the people are wearing may include a badge.

Alternatively or additionally, the one or more identifiable features of what the people are wearing may include a uniform.

Alternatively or additionally, the method further includes using facial recognition to help determine whether a person belongs to the at least one protected group of people or the at least one unprotected group of people.

Alternatively or additionally, the at least one unprotected group of people may include security officers.

Alternatively or additionally, the at least one unprotected group of people may include custodians and/or housekeeping individuals.

Alternatively or additionally, determining that some of the plurality of people belong to the at least one protected group of people may be based upon one or more identifiable features of what the people are wearing.

Another example of the disclosure includes a method of displaying video surveillance footage that can include footage of motor vehicles having license plates. The method includes analyzing the video surveillance footage to identify vehicles that fall into a protected group for which license plates are anonymized and vehicles that fall into an unprotected group for which license plates are allowed to be viewed when displaying the video surveillance footage and displaying the video surveillance footage while anonymizing license plates for vehicles in the protected group and not anonymizing license plates for vehicles in the unprotected group. Identifying the vehicles includes identifying an indicator displayed by the vehicle that signifies that the vehicle belongs to the unprotected group.

Alternatively or additionally, the indicator may include an indicia placed on the vehicle.

Alternatively or additionally, the indicator may include a sticker bearing a recognizable indicia.

Alternatively or additionally, the indicator may include the license plate of each vehicle.

Another example of the disclosure includes a method of displaying video surveillance footage that includes footage of motor vehicles having license plates, the motor vehicles including vehicles associated with an entity and vehicles not associated with the entity. The method includes analyzing the video surveillance footage to determine which vehicles are associated with the entity and which vehicles that are not associated with the entity and displaying the video surveillance footage with license plates attached to vehicles that are associated with the entity not obscured and license plates attached to vehicles that are not associated with the entity being obscured.

Alternatively or additionally, vehicles that are associated with the entity may include vehicles driven by employees of a corporate entity.

Alternatively or additionally, vehicles that are associated with the entity may include vehicles owned by a corporate entity.

Alternatively or additionally, vehicles that are not associated with the entity may include vehicles driven by visitors.

Alternatively or additionally, determining which vehicles are associated with the entity may include identifying an indicia placed on the vehicle.

Alternatively or additionally, the indicia may include a sticker bearing a company name.

Alternatively or additionally, the indicia may include the license plate of each vehicle.

Another example of the disclosure includes a method of displaying video surveillance footage that includes footage of one or more individuals who should be identifiable in the footage while remaining people should be anonymized in the footage when displayed. The method includes analyzing the video surveillance footage to identify the one or more individuals who should be identified, analyzing the video surveillance footage to locate possible faces to anonymize and displaying the video surveillance footage with the one or more individuals who should be identified with their faces not anonymized and with other faces anonymized.

Alternatively or additionally, identifying the one or more individuals who should be identifiable may include using facial recognition.

Alternatively or additionally, locating possible faces to anonymize may include using facial recognition.

Alternatively or additionally, locating possible faces to anonymize may include using background subtraction to locate possible movement, where movement is denoted as possibly indicating a person.

Alternatively or additionally, locating possible faces to anonymize may include using color matching to locate possible human skin tones.

Alternatively or additionally, individuals who should be identifiable in the footage may include one or more individuals accused of a crime, and faces to anonymize may include one or more victims of the crime.

Alternatively or additionally, individuals who should be identifiable in the footage may include one or more visitors, and faces to anonymize may include employees.

Alternatively or additionally, video footage may be analyzed over a length of video footage, covering a period of time, when analyzing the video surveillance footage.

Alternatively or additionally, when an individual is identified at two or more distinct times within a length of video footage, that individual may be deemed to be identified at all points within the length of video footage.

Alternatively or additionally, an individual may not be anonymized at all at any time during the length of video footage when that individual is determined to be one of the one or more individuals who should be identifiable and is otherwise anonymized at all times during the length of video footage when that individual is not one of the one or more individuals who should be identifiable.

Another example of the disclosure includes a video monitoring system that is configured to display video surveillance footage so that a security officer may view the video surveillance footage, the video monitoring system configured to selectively anonymize at least some of the people who are visible in the video surveillance footage. The video monitoring system includes a people detection module that is configured to receive video surveillance footage from one or more cameras, and to analyze the footage to identify one or more of people in the video surveillance footage. The video monitoring system includes a selective anonymization module that is configured to selectively anonymize one or more of the people identified in the video surveillance footage based on one or more predetermined criteria.

Alternatively or additionally, the selective anonymization module may be configured to receive information pertaining to people who should not be anonymized.

Alternatively or additionally, the people who should not be anonymized may include people accused of a crime.

Alternatively or additionally, the people who should not be anonymized may include visitors.

Alternatively or additionally, the selective anonymization module may be applied when displaying the video surveillance footage via the video monitoring system and does not alter the original video surveillance footage.

Alternatively or additionally, the people detection module may use background subtraction to identify moving objects, where moving objects may be people.

Alternatively or additionally, the people detection module may use color detection to detect colors that may represent a skin color.

Alternatively or additionally, the selective anonymization module may be configured to pixelate portions of images that are believed to correspond to faces of people to be anonymized.

Alternatively or additionally, the selective anonymization module may be configured to fuzzball portions of images that are believed to correspond to faces of people to be anonymized.

Another example of the disclosure includes a method of training a video monitoring system that is used to display video surveillance footage so that a security officer may view the video surveillance footage, the video monitoring system configured to selectively anonymize at least some of the people who are visible in the video surveillance footage. The method includes providing videos of people to the video monitoring system as training data so that the video monitoring system can learn identities of the people in the videos and adding matched images of faces in surveillance videos to the training data. More recent images and corresponding identifications may be given a greater weight when attempting to identify a person.

Having thus described several illustrative embodiments of the present disclosure, those of skill in the art will readily appreciate that yet other embodiments may be made and used within the scope of the claims hereto attached. It will be understood, however, that this disclosure is, in many respects, only illustrative. Changes may be made in details, particularly in matters of shape, size, arrangement of parts, and exclusion and order of steps, without exceeding the scope of the disclosure. The disclosure's scope is, of course, defined in the language in which the appended claims are expressed.

What is claimed is:

1. A method of providing privacy to individuals shown in video surveillance footage while viewing the video surveillance footage on a surveillance monitoring system, wherein the video surveillance footage includes a monitor, a keyboard, and a camera, the method comprising:

displaying the video surveillance footage on the monitor, the video surveillance footage including identifiable faces that are displayed without being anonymized;

the camera of the surveillance monitoring system monitoring a space within viewing sight of the monitor;

the surveillance monitoring system detecting any viewing faces visible within the viewing sight of the monitor and determining whether the detected viewing faces belong to authorized individuals who are authorized to view video surveillance footage on the monitor or if any of the detected viewing faces belong to individuals who are not authorized to view video surveillance footage on the monitor;

when the detected viewing faces belong only to authorized individuals, indicating that there were no unauthorized individuals detected, the surveillance monitoring system continues to display the video surveillance footage that includes identifiable faces without anonymizing the identifiable faces; and when the detected viewing faces also include unauthorized individuals, the surveillance monitoring system continues to display the video surveillance footage, but the surveillance monitoring system automatically anonymizes one or more of the identifiable faces seen in the video surveillance footage.

2. The method of claim 1, further comprising the surveillance monitoring system issuing an alert that an unauthorized individual is within viewing sight of the monitor.

3. The method of claim 2, wherein the alert comprises an auditory alert and/or a visible alert.

4. The method of claim 1, wherein the camera comprises a video camera aimed at the space within viewing sight of the monitor.

5. The method of claim 4, wherein the surveillance monitoring system analyzes a video feed from a video camera to detect any viewing faces visible within the viewing sight of the monitor.

6. The method of claim 5, further comprising anonymizing any identifiable faces seen in the video surveillance footage and issuing an alert when a determination is made that the video feed from the video camera is disrupted.

7. The method of claim 1, further comprising:
when one or more viewing faces cannot be reliably identified, but are not indicated as belonging to individuals who are authorized to view video surveillance footage on the monitor, the video monitoring system anonymizing any identifiable faces visible in the video surveillance footage displayed on the monitor.

8. The method of claim 1, further comprising making a secondary check for an unauthorized individual viewing the video surveillance footage.

9. The method of claim 8, wherein making the secondary check comprises comparing an identification of an operator at the monitor and keyboard as identified via facial recognition with log in credentials used by the operator to log into the video monitoring system.

10. The method of claim 9, wherein making the secondary check comprises monitoring the operator's key strokes, and comparing the operator's key strokes to a known key stroke pattern for a particular authorized operator as identified via facial recognition and/or via their log in credentials.

11. A video monitoring system configured to provide privacy for individuals shown in video surveillance footage while displaying the video surveillance footage on the video monitoring system, the video monitoring system comprising:
a monitor configured to display video surveillance footage;
a keyboard;
a video camera that is aimed at a space in front of the monitor and the keyboard;
a controller operably coupled to the monitor and to the keyboard, the controller configured to control display of video surveillance footage on the monitor;
the controller further configured to:
identify faces detected by the video camera aimed at the space in front of the monitor and the keyboard in order to ascertain an identity of an operator using the monitor and keyboard as well as to ascertain whether there are any unauthorized individuals possibly viewing the video surveillance footage displayed on the monitor;
display video surveillance footage on the monitor, including showing one or more identifiable faces in the video surveillance footage, when no unauthorized individuals are detected; and
anonymizing one or more identifiable faces in the video surveillance footage when one or more unauthorized individuals are detected.

12. The video monitoring system of claim 11, wherein the controller is further configured to capture log in credentials used by the operator and match the log in credentials with the identity of the operator as determined by identifying a face of the operator.

13. The video monitoring system of claim 11, wherein the controller is further configured to capture keystrokes of the operator to identify a keystroke pattern, and compare the identified keystroke pattern with a historical keystroke pattern for the operator as determined by identifying a face of the operator.

14. The video monitoring system of claim 11, wherein the controller is further configured to anonymize one or more identifiable faces in the video surveillance footage displayed on the monitor in response to a detected tampering with the video camera that is aimed at the space in front of the monitor and the keyboard.

15. The video monitoring system of claim 11, wherein the controller is further configured to issue an alert when an unauthorized individual is detected within viewing sight of the monitor.

* * * * *